United States Patent
Huang et al.

(10) Patent No.: US 12,471,151 B2
(45) Date of Patent: *Nov. 11, 2025

(54) ORTHOGONAL FREQUENCY DIVISION MULTIPLE ACCESS COMMUNICATION APPARATUS AND COMMUNICATION METHOD

(71) Applicant: Panasonic Intellectual Property Corporation of America, Torrance, CA (US)

(72) Inventors: Lei Huang, Singapore (SG); Rojan Chitrakar, Singapore (SG); Yoshio Urabe, Nara (JP); Isamu Yoshii, Chiba (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 18/330,848

(22) Filed: Jun. 7, 2023

(65) Prior Publication Data

US 2023/0319902 A1 Oct. 5, 2023

Related U.S. Application Data

(63) Continuation of application No. 17/227,075, filed on Apr. 9, 2021, now Pat. No. 11,711,857, which is a (Continued)

(30) Foreign Application Priority Data

Dec. 19, 2016 (JP) .................. 2016-245567

(51) Int. Cl.
*H04W 74/0833* (2024.01)
*H04L 5/00* (2006.01)
(Continued)

(52) U.S. Cl.
CPC ......... *H04W 74/085* (2013.01); *H04L 5/0007* (2013.01); *H04L 5/0091* (2013.01);
(Continued)

(58) Field of Classification Search
None
See application file for complete search history.

(56) References Cited

U.S. PATENT DOCUMENTS 9,942,010 B1 * 4/2018 Chu ...................... H04L 5/0007
10,721,175 B2 7/2020 Ahn et al.
(Continued)

FOREIGN PATENT DOCUMENTS

WO WO 2016126370 A1 8/2016

OTHER PUBLICATIONS

Extended European Search Report, dated Aug. 2, 2019 for European Patent Application No. 17848553.8-1219, 10 pages.
(Continued)

*Primary Examiner* — Anh Ngoc M Nguyen
(74) *Attorney, Agent, or Firm* — Seed Intellectual Property Law Group LLP

(57) ABSTRACT

An communication apparatus of the present disclosure comprises a receiver that receives a Trigger frame for allocating resource units (RUs) for random access and another frame including Random Access parameter element that comprises a first field indicating an OFDMA contention window (OCW) minimum value (OCWmin) and a second field indicating an OCW maximum value (OCWmax); and control circuitry that controls Uplink OFDMA-based Random Access (UORA) procedure using the OCWmin and the OCWmax.

14 Claims, 22 Drawing Sheets

Related U.S. Application Data continuation of application No. 16/322,419, filed as application No. PCT/JP2017/029706 on Aug. 21, 2017, now Pat. No. 11,006,461.

(60) Provisional application No. 62/385,006, filed on Sep. 8, 2016.

(51) Int. Cl.
  H04W 72/0446 (2023.01)
  H04W 72/21 (2023.01)
  H04W 74/00 (2009.01)
  H04W 76/11 (2018.01)

(52) U.S. Cl.
  CPC ....... H04W 72/0446 (2013.01); H04W 72/21 (2023.01); H04W 74/004 (2013.01); H04W 76/11 (2018.02)

(56) References Cited

U.S. PATENT DOCUMENTS

| | | | |
|---|---|---|---|
| 10,728,846 | B2 | 7/2020 | Choi et al. |
| 11,006,461 | B2 * | 5/2021 | Huang ................. H04W 76/11 |
| 11,711,857 | B2 * | 7/2023 | Huang ................. H04L 5/0091 |
| | | | 370/329 |
| 2016/0057657 | A1 | 2/2016 | Seok |
| 2016/0165598 | A1 | 6/2016 | Azizi et al. |
| 2016/0219512 | A1 | 7/2016 | Asterjadhi et al. |
| 2016/0227565 | A1 | 8/2016 | Ghosh |
| 2016/0227579 | A1 | 8/2016 | Stacey et al. |
| 2016/0323426 | A1 | 11/2016 | Hedayat |
| 2016/0353435 | A1 | 12/2016 | Ghosh |
| 2017/0013616 | A1 | 1/2017 | Wentink et al. |
| 2017/0257887 | A1 | 9/2017 | Ghosh et al. |
| 2018/0184454 | A1 * | 6/2018 | Viger ............... H04W 74/0808 |
| 2019/0313466 | A1 | 10/2019 | Ko et al. |

OTHER PUBLICATIONS

Extended European Search Report, dated Mar. 28, 2023, for corresponding European Patent Application No. 23152807.6-1213. (14 pages).
IEEE 802.11-15/0132r15, "Specification Framework for TGax," May 25, 2016, 61 pages.
IEEE 802.11-15/0132r2, "Specification Framework for TGax," Jan. 15, 2015, 3 pages.
IEEE 802.11-15/1105r0, "UL OFDMA-based Random Access Procedure," Sep. 14, 2015, 19 pages.
IEEE 802.11-15/1107r0, "Power Save with Random Access," Sep. 14, 2015, 21 pages.
IEEE 802.11-15/1137, "Triggered OFDMA Random Access Observations," Sep. 11, 2015, 14 pages.
IEEE 802.11-16/0024r1, "Proposed TGax draft specification," Mar. 2, 2016, 160 pages.
IEEE 802.11-16/0399r1, "Considerations on Trigger Frame for Random Access Procedure," Mar. 14, 2016. 6 pages.
IEEE 802.11-16/0582r3, "Random Access RU Allocation in the Trigger Frame," May 16, 2016, 24 pages.
IEEE 802.11-16/0661r1, "Adaptive Random Access UL OFDMA," May 16, 2016, 14 pages.
IEEE 802.11-16/0780r1, "CIDs for: Section 9.3.1.23 Trigger Frame Format", Apr. 17, 2016, 12 pages.
IEEE 802.11-16/0806r0, "HE Variant HT Control—Buffer Status Report", Jul. 6, 2016, 11 pages.
IEEE 802.11-16/0906r0, "RU Restriction of 20MHz Operating Devices in OFDMA", Jul. 25, 2016, 33 pages.
IEEE 802.11-16/0907r2, "20MHz-only Device in 11ax", Jul. 25, 2016, 21 pages.
IEEE 802.11-16/0907r3, "20MHz-only Device in 11ax", Jul. 25, 2016, 21 pages.
IEEE 802.11-16/0909r2, "Spec text for 20MHz-only devices in 11ax", Jul. 8, 2016, 3 pages.
IEEE 802.11-16/1158r0, "Comment resolution on OFDMA Random access procedure", Sep. 10, 2016, 3 pages.
IEEE 802.11-16/1162r3, "Comment Resolution on Retansmission of OFDMA Random Access", Sep. 11, 2016, 6 pages.
IEEE 802.11-16/1222r0, "Resolution for CIDs on UL OFDMA-based Random Access", Sep. 12, 2016, 13 pages.
IEEE 802.11-16/1458r0, "Resolution for CIDs on Power Save with UL OFDMA-based Random Access", Nov. 3, 2016, 9 pages.
IEEE 802.11-16/1477r2, "CC23 Proposed Resolution (Update for) TWT Element," Nov. 5, 2016, 8 pages.
IEEE 802.11-16/1516r1, "CIDs for: Section 9.3.1.23 Random Access CIDs", Nov. 4, 2016, 4 pages.
IEEE 802.11-17/0708r0, "Proposed resolution for comments related to CIDs in in 27.5.2.6 (Random Access)," May 3, 2017, 8 pages.
IEEE Computer Society. " Draft Standard for Information technology— Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN(#1121)," 802.11 Working Group, LAN/MAN Standards Committee, IEEE P802.11ax/D0.4, Aug. 2016. (317 pages).
IEEE, "High Efficiency (HE) MAC specification," IEEE P802.11ax/D1.0, Nov. 1, 2016, 66 pages.
Indian Examination Report dated Jun. 26, 2021, for the corresponding Indian Patent Application No. 201947000654, 6 pages.
International Search Report, dated Oct. 31, 2017, for PCT Application No. PCT/JP2017/029706, 2 pages.

* cited by examiner

ORTHOGONAL FREQUENCY DIVISION MULTIPLE ACCESS COMMUNICATION APPARATUS AND COMMUNICATION METHOD

TECHNICAL FIELD

The present disclosure is generally related to a communication apparatus and a communication method.

BACKGROUND ART

The IEEE (Institute of Electrical and Electronics Engineers) 802.11 Working Group is developing 802.11ax HE (High Efficiency) WLAN (Wireless Local Area Network) air interface in order to achieve a very substantial increase in the real-world throughput achieved by users in high density scenarios. OFDMA (Orthogonal Frequency Division Multiple Access) multiuser transmission has been envisioned as one of the most important features in 802.11ax. OFDMA is a multiple access scheme that performs multiple operations of data streams to and from the plurality of users over the time and frequency resources of the OFDM (Orthogonal Frequency Division Multiplexing) system.

Studies are underway to perform frequency scheduling for OFDMA multiuser transmission in 802.11ax. Frequency scheduling is generally performed based on an RU (Resource Unit). An RU comprises a plurality of consecutive subcarriers. According to frequency scheduling, a radio communication access point apparatus (hereinafter simply "access point" or "AP") adaptively assigns RUs to a plurality of radio communication station apparatuses (hereinafter simply "terminal stations" or "STAs") based on reception qualities of frequency bands of the STAs. This makes it possible to obtain a maximum multiuser diversity effect and to perform communication quite efficiently.

However, certain conditions have been imposed on uplink (UL) multi-user OFDMA transmissions. For example, all STAs taking part in an UL multi-user OFDMA transmission need to synchronize their transmissions to start at the same time point and to end at the same time point as well. In 802.11ax, this is achieved by an AP that transmits a special control frame called a Trigger frame. The Trigger frame carries information such as the identity information of each of the STAs that may take part in the UL multi-user transmission, the transmission duration, the RU allocation for each STA and other useful information. STAs that are indicated in the Trigger frame transmit their respective frames on their respectively allocated RU after a fixed interval of time, e.g., SIFS (Short Interframe Spacing, since the end of the Trigger frame). This arrangement works well when the AP has enough information regarding the STAs taking part in the UL multi-user transmission such as buffer status and STA operating state, etc. But, there are cases where the AP may not have adequate information about the STAs to perform the RU allocation in an efficient manner. In such cases, it is beneficial to allocate RUs to STAs and let the STAs contend for the RUs based on their actual needs. To meet such needs, UL OFDMA-based random access (UORA) mechanism has been introduced in 802.11ax.

CITATION LIST

Non Patent Literature

[NPL 1] IEEE802.11-15/0132r17, Specification Framework for TGax, May 2016

[NPL 2] IEEE802.11-16/0024r1, Proposed TGax draft specification, March 2016

[NPL 3] IEEE802.11-15/1105r0, UL OFDMA-based Random Access Method, September 2015

[NPL 4] IEEE 802.11-15/1137r1, Triggered OFDMA Random Access Observations, September 2015

[NPL 5] IEEE 802.11-16/0780r1, CIDs for: Section 9.3.1.23 Trigger Frame Format, April 2016

[NPL 6] IEEE 802.11-16/0806r0, HE Variant HT Control—Buffer Status Report, July 2016

[NPL 7] IEEE 802.11-15/1107r0, Power Save with Random Access, September 2015

[NPL 8] IEEE 802.11-16/0907r3, 20 MHz-only Device in 11ax, July 2016

[NPL 9] IEEE 802.11-16/0906r0, RU Restriction of 20 MHz Operating Devices in OFDMA, July 2016

[NPL 10] IEEE 802.11-16/1162r3, Comment Resolution on Retransmission of OFDMA Random Access, September 2016

[NPL 11] IEEE 802.11-16/1158r0, Comment resolution on OFDMA Random access method, September 2016

[NPL 12] IEEE 802.11-16/1222r1, Resolution for CIDs on UL OFDMA-based Random Access, September 2016

[NPL 13] IEEE 802.11-16/1516r1, Random Access CIDs, November 2016

[NPL 14] IEEE 802.11-16/1458r0, Resolution for CIDs on Power Save with UL OFDMA-based Random Access, November 2016

[NPL 15] IEEE 802.11-16/1477r2, CC23 Proposed Resolution (Update for) TWT Element, November 2016

SUMMARY OF INVENTION

In 802.11ax, some RUs in 40, 80, 80+80 or 160 MHz OFDMA operation are restricted from being used for 20 MHz operating STAs. There is currently no rule regarding how RUs are assigned for random access in a Trigger frame by an AP. In some cases, no RUs assigned for random access in a Trigger frame are available to 20 MHz operating STAs and thus a 20 MHz operating STA cannot get an opportunity to reach the AP with the UORA mechanism when receiving the Trigger frame for random access.

One non-limiting and exemplary embodiment of the present disclosure provides a communication apparatus that can facilitate allowing a 20 MHz operating STA to get an opportunity to reach the AP with the UORA mechanism.

In one general aspect, the techniques disclosed here feature a communication apparatus comprising a receiver that receives a Trigger frame for allocating resource units (RUs) for random access and another frame including Random Access parameter element that comprises a first field indicating an OFDMA contention window (OCW) minimum value (OCWmin) and a second field indicating an OCW maximum value (OCWmax); and control circuitry that controls Uplink OFDMA-based Random Access (UORA) procedure using the OCWmin and the OCWmax.

These general and specific aspects may be implemented using a device, a system, a method, and a computer program, and any combination of devices, systems, methods, and computer programs.

By taking advantage of the apparatus and method described in the present disclosure, a 20 MHz operating STA can get an opportunity to reach the AP with the UORA mechanism.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

The present disclosure can be better understood with the aid of following figures and embodiments. The embodiments described here are merely exemplary in nature and are used to describe some of the possible applications and uses of the present disclosure and should not be taken as limiting the present disclosure with regard to alternative embodiments that are not explicitly described herein.

In any wireless communication system, a wide variety of devices may be a part of the wireless network, each device differing in terms of traffic needs, device capabilities, power supply types and so on. Some class of devices may have high bandwidth requirements, high QoS (Quality of Service) requirements in terms of latency or transmission success rate etc. But they may not be very concerned about power consumption since they may be main-powered or have large batteries (e.g., laptop computers). While another class of devices may have less bandwidth requirements and also less stringent QoS requirements but may be relatively more concerned about power consumption (e.g., mobile phones). Yet another class of devices may have low bandwidth requirements as well as very low duty cycles but may be very sensitive to power consumption due to extremely small batteries or extremely long life expectancy (e.g., sensors for remote sensing).

In many wireless communication systems, there will be one or more central controllers which will determine the wireless network coverage area, the wireless frequency channels, the device admission policy, coordination with other neighboring wireless networks etc. and usually also act as a gateway to the backend infrastructure network. Examples of the central controllers are base stations or eNBs in cellular wireless networks or APs in WLANs.

Even though the techniques described in the present disclosure may apply to many wireless communication systems, for the sake of example, the rest of the descriptions in this disclosure are described in terms of an IEEE 802.11 WLAN system and its associated terminologies. This should not be taken as limiting the present disclosure with regard to alternative wireless communication systems. In IEEE 802.11 based WLANs, majority of networks operate in infrastructure mode, i.e., all or most of the traffic in the network need to go through the AP. As such, any STA wishing to join the WLAN must first negotiate the network membership with the AP through a process called association and authentication.

Figure 1:
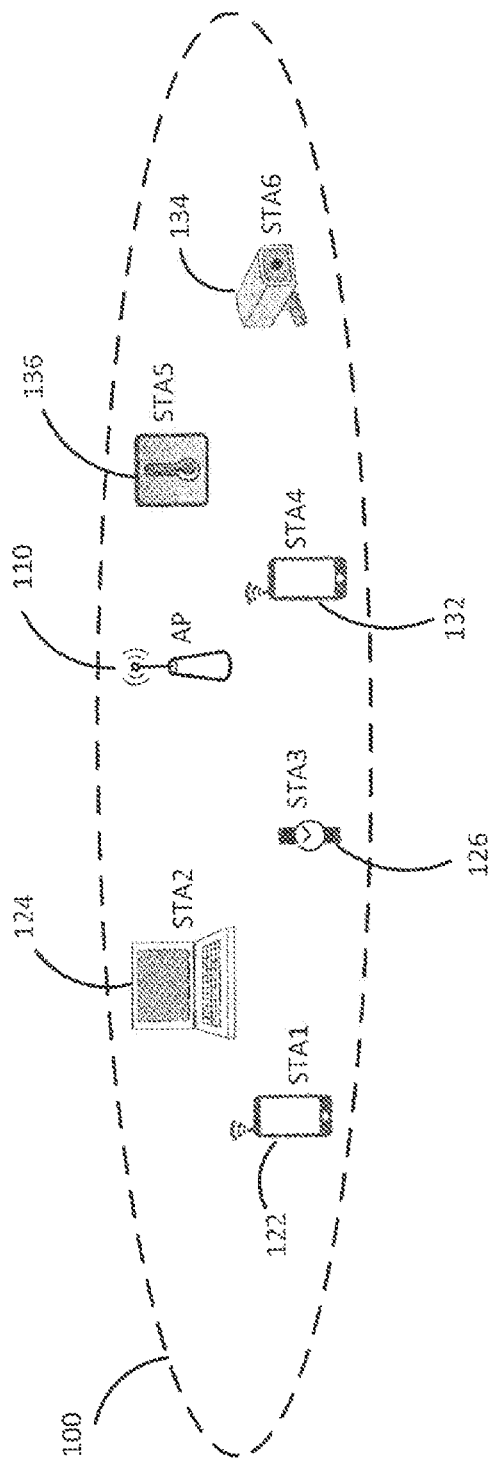
FIG. 1 is a diagram illustrating a multiuser wireless communication systems.

FIG. 1 illustrates an example wireless network 100 including an AP 110 and a plurality of STAs. STA2 124 and STA6 134 represent a device class with high bandwidth and possibly high QoS requirements and relatively low requirement for power saving, which may be able to operate with 20, 40, 80, 80+80 or 160 MHz channel width. STA1 122 and STA4 132 represent another device class that may also have high bandwidth and possibly high QoS requirements but are relatively more concerned about power consumptions, which may be able to operate 20, 40 or 80 MHz channel width. On the other extreme, STA3 126 and STA5 136 represent another class of devices that may have low bandwidth requirements but may be very sensitive to power consumption, which may be able to operate with 20 MHz channel width only. STAs of this device class may be called "20 MHz operating STAs" or "20 MHz only STAs." Notice that 20 MHz operating STAs (e.g., STA3 126 and STA5 136) operate in the primary 20 MHz channel only. In other words, RUs which are not located in the primary 20 MHz channel cannot be used by 20 MHz operating STAs. In addition, non-20 MHz operating STAs (e.g., STA1 122, STA2 124, STA4 132 and STA6 134) may reduce their operating channel width to 20 MHz by the so-called operating mode indication procedure for power saving purpose.

RU tone mapping in 20 MHz bandwidth is not aligned with RU tone mapping in 40, 80, 80+80 or 160 MHz bandwidth. Due to misalignment of RU locations, some of RUs may cause significant performance penalty or interference to neighbor RUs when a 20 MHz operating STA engages in 40, 80, 80+80 or 160 MHz downlink (DL) or UL OFDMA operation. To improve throughput and interoperability, some RUs in 40, 80, 80+80 or 160 MHz OFDMA operation are restricted from being used for 20 MHz operating STAs. In more details, in terms of 40 MHz DL or UL OFDMA operation, 2 out of 18 (i.e., 5%) 26-tone RUs shall be restricted from being used for 20 MHz operating STAs. In terms of 80 MHz DL or UL OFDMA operation, 7 out of 37 (i.e., 19%) 26-tone RUs, 2 out of 16 (i.e., 12.5%) 52-tone RUs, 2 out of 8 (i.e., 25%) 106-tone RUs shall not be allocated to 20 MHz operating STAs. In terms of 80+80 or 160 MHz DL or UL OFDMA operation, 14 out of 74 (i.e., 19%) 26-tone RUs, 4 out of 32 (i.e., 12.5%) 52-tone RUs, 4 out of 16 (i.e., 25%) 106-tone RUs shall not be allocated to 20 MHz operating STAs. Furthermore, a 242-tone RU shall not be allocated to 20 MHz operating STAs in 40, 80, 80+80 or 160 MHz UL OFDMA operation. Apparently, the number of RUs that are restricted from being used for 20 MHz operating STAs in 40, 80, 80+80 or 160 MHz OFDMA operation is not insignificant.

<UL OFDMA-Based Random Access>

UORA is a mechanism for STAs to randomly select RUs assigned for random access by the AP 110 in a soliciting Trigger frame. An STA that uses the UORA mechanism maintains an internal counter termed as OFDMA Backoff (OBO) counter. The OFDMA Contention Window (OCW) is an integer with an initial value of OCWmin and an upper limit of OCWmax. The AP 110 reports to STAs the values of OCWmin and OCWmax for the UORA operation.

Figure 2:
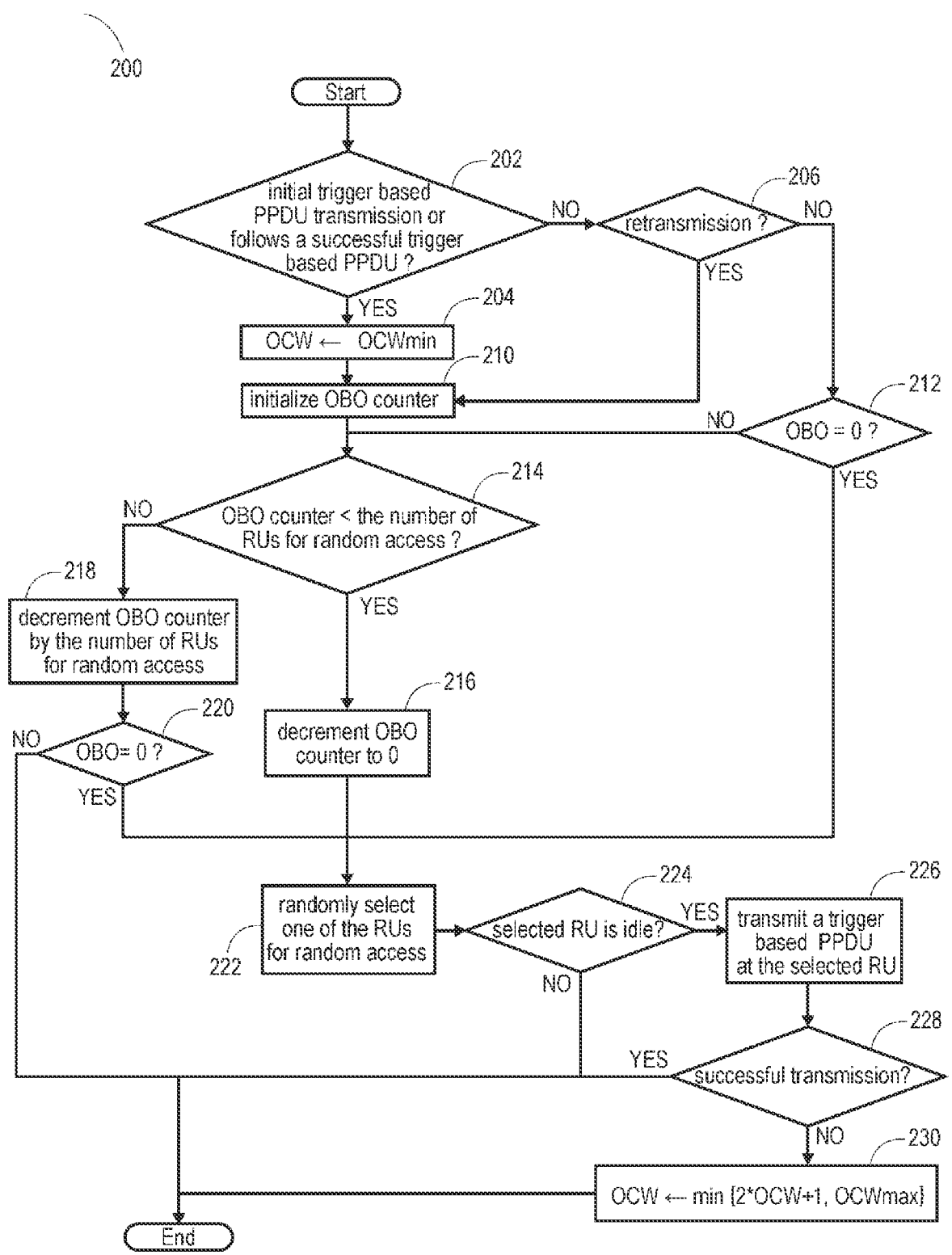
FIG. 2 is a flow chart illustrating an example UL OFDMA based random access method operated by an STA.

FIG. 2 illustrates an example UORA method 200 operated by an STA. The UORA method 200 starts when the STA receives a Trigger frame for random access from the AP 110. Details of the example UORA method will be described later.

Figure 4:
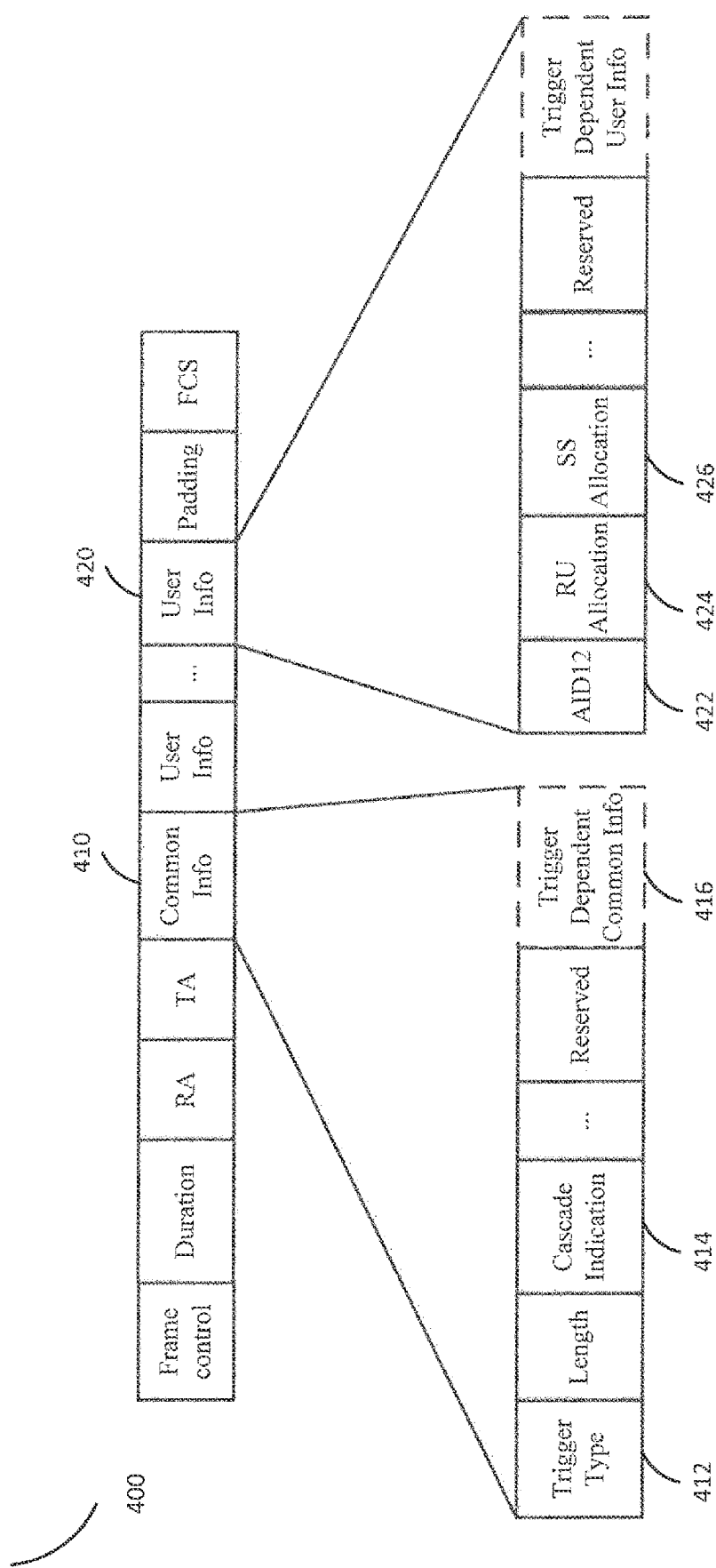
FIG. 4 is a diagram illustrating an example format of the Trigger frame.

FIG. 4 illustrates an example format of the Trigger frame 400, which comprises a Common Info field 410 and one or more User Info field 420. The Common Info field 410 comprises a Trigger Type subfield 412, a Cascade Indication subfield 414 and an optional Trigger Dependent Common Info subfield 416. The Trigger Type subfield 412 indicates the type of the Trigger frame 400, e.g., basic Trigger, beamforming report poll Trigger, BSRP (Buffer Status Report Poll) Trigger or random access Trigger. Notice that the random access Trigger frame contains a single User Info field 420. The AP 110 may transmit a basic Trigger frame, a random access Trigger frame or a BSRP Trigger frame that contains one or more RUs for random access. If the Cascade Indication subfield 414 is 1, then a subsequent Trigger frame follows the Trigger frame 400. Otherwise the Cascade Indication subfield 414 is 0. The User Info field 420 comprises an AID12 subfield 422, an RU Allocation subfield 424 and a SS Allocation subfield 426. The AID12 subfield 422 carries the least significant 12 bits of the AID (Association Identifier) of the STA for which the User Info field 420 is intended. The AID12 subfield 422 that is 0 indicates that the User Info field 420 identifies an RU for random access. The RU Allocation subfield 424 indicates the RU allocated to the STA identified by the AID12 subfield 422 to transmit a Trigger based PPDU (Physical Layer Protocol Data Unit). Except for the random access Trigger frame, the SS Allocation subfield 426 of the User Info field 420 indicates the spatial streams of the Trigger based PPDU response of the STA identified by the AID12 subfield 422. For the random access Trigger frame, the SS Allocation subfield 426 of the User Info field 420 indicates the number of contiguous RUs used for random access starting from the RU indicated in the RU Allocation subfield 422, and each RU has the same size as the size of the RU indicated in RU Allocation subfield 422.

Going back to FIG. 2, at step 202, the STA determines if its UL transmission is an initial trigger based PPDU transmission or follows a successful trigger based PPDU transmission. If its UL transmission is an initial trigger based PPDU transmission or follows a successful trigger based PPDU transmission, the STA sets the value of OCW to OCWmin at step 204. Otherwise the STA continues to check if its UL transmission is retransmission of an unsuccessful trigger based PPDU transmission at step 206. If its UL transmission is retransmission of an unsuccessful trigger based PPDU transmission, the UORA method 200 proceeds to step 210. Otherwise the UORA method 200 jumps to step 212.

At step 210, the STA initializes its OBO counter to a random value in the range of zero and OCW and the UORA method 200 goes to step 214. At step 212, the STA determines if its OBO counter is equal to zero. If its OBO counter is equal to zero, this implies the STA won the contention and selected one of the RUs for random access in the previously received Trigger frame and but did not transmit a trigger-based PPDU in the previously selected RU which was considered busy, and the UORA method 200 goes to step 222. If its OBO counter is not equal to zero, this implies that the STA did not win the contention to access the RUs for random access in the previously received Trigger frame and the UORA method 200 goes to step 214.

At step 214, the STA checks if its OBO counter is smaller than the number of RUs for random access in the received Trigger frame. If its OBO counter is smaller than the number of RUs for random access in the received Trigger frame, the STA decrements its OBO counter to zero at step 216, i.e., it wins the random access contention, and the UORA method 200 jumps to step 222. Otherwise the STA decrements its OBO counter by the number of RUs for random access in the received Trigger frame at step 218. Notice that when its OBO counter is the same as the number of RUs for random access in the received Trigger frame, the STA actually decrements its OBO counter to zero. At step 220, the STA determines if its OBO counter is equal to zero. If its OBO counter is equal to zero, it wins the random access contention and the UORA method 200 goes to step 222. Otherwise the UORA method 200 just stops.

At step 222, the STA randomly selects one of the RUs for random access in the received Trigger frame. At step 224, the STA checks if the selected RU is idle as a result of both physical and virtual carrier sensing. If the selected RU is idle, the STA transmits a trigger based PPDU at the selected RU at step 226. Otherwise the UORA method 200 just stops.

At step 228, the STA determines if the trigger-based PPDU is successfully transmitted at the selected RU. If the trigger-based PPDU transmitted at the selected RU solicits an immediate response and the expected response is not received, the transmission is considered unsuccessful and the UORA method 200 goes to step 230. Otherwise, the transmission is considered successful and the UORA method 200 just stops. If the trigger-based PPDU transmitted at the selected RU does not solicit an immediate response, the transmission is also considered successful. At step 230, the STA sets the value of OCW to the minimum of {a sum of double the current value of OCW and one} and {a value of OCWmax} and then the UORA method 200 just stops.

Figure 3:
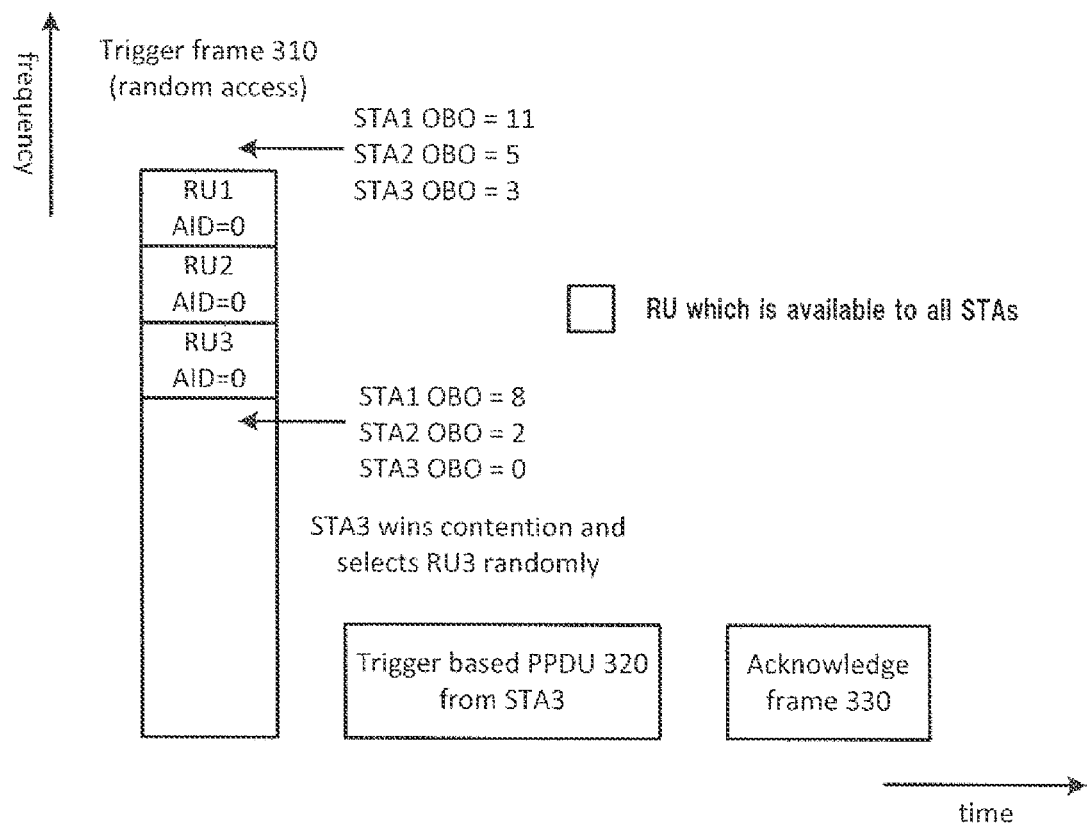
FIG. 3 is a diagram illustrating example multi-user frame exchange related to UL OFDMA based random access.

FIG. 3 illustrates example multi-user frame exchange involving STAs using the example UORA method 200 as illustrated in FIG. 2. Three STAs (e.g., STA1 122, STA2 124 and STA3 126 in FIG. 1) contend for UL transmission using the UORA method 200. STA1 122, STA2 124 and STA3 126 start the UORA method 200 when receiving the Trigger frame 310 from the AP 110. The Trigger frame 310 contains three RUs for random access (i.e., RU1, RU2 and RU3 with AID set to zero) which are available to all STAs. Assume that UL transmission for each of STA1 122, STA2 124 and STA3 126 is an initial Trigger based PPDU transmission or follows a successful Trigger based PPDU transmission, and the OBO counters for STA1 122, STA2 124 and STA3 126 are initialized to 11, 5 and 3, respectively. Since the number of RUs for random access in the received Trigger frame 310 is three, the OBO counters for STA1 122, STA2 124 and STA3 126 becomes 8, 2 and 0, respectively. Eventually STA3 126 with its OBO counter being 0 wins the contention, randomly selects RU3 which is considered idle and transmits a trigger based PPDU 320 at RU3 SIFS after receiving the Trigger frame 310. If STA3 126 receives an acknowledge frame 330 from the AP 110 within a determined time period after transmitting the Trigger based PPDU 320, the transmission of the Trigger based PPDU 320 is successful. Otherwise the transmission of the Trigger based PPDU 320 is unsuccessful.

Although UORA may be scheduled at any time point at the discretion of the AP 110, a most likely usage scenario is at times when the AP 110 has no knowledge on the presence of unassociated STAs that are not able to communicate with the AP 110. Specifically, the AP 110 may not know the presence of unassociated 20 MHz operating STAs. Notice that there is currently no rule regarding how RUs are assigned by the AP 110 for random access in a Trigger frame. In some cases, no RUs assigned by the AP 110 for random access in a Trigger frame are available to 20 MHz operating STAs. In other words, no RUs assigned for random access in a Trigger frame are in the primary 20 MHz channel and unrestricted to be used for 20 MHz operating STAs. In this case, a 20 MHz operating STA cannot get an opportunity to reach the AP 110 with the UORA method 200 when receiving the Trigger frame for random access.

Next, according to the present disclosure, various embodiments of an apparatus and a method for UORA will be explained in further details.

First Embodiment

According to a first embodiment of the present disclosure, a first example UORA method operated by the AP 110 is that every N-th Trigger frame for random access transmitted by the AP 110 includes at least one RU for random access which is available to 20 MHz operating STAs, where N is a positive integer. In other words, every N-th Trigger frame for random access contains at least one RU for random access which is in the primary 20 MHz channel and unrestricted from being used for 20 MHz operating STAs.

According to the first embodiment of the present disclosure, a second example UORA method operated by the AP 110 is that in a determined period of time (e.g., one Beacon interval), the AP 110 transmits one or more Trigger frame for random access, each including at least one RU for random access which is available to 20 MHz operating STAs.

According to the first embodiment of the present disclosure, a 20 MHz operating STA is given an opportunity to reach the AP 110 with the UORA mechanism when receiving Trigger frames for random access.

Figure 5:
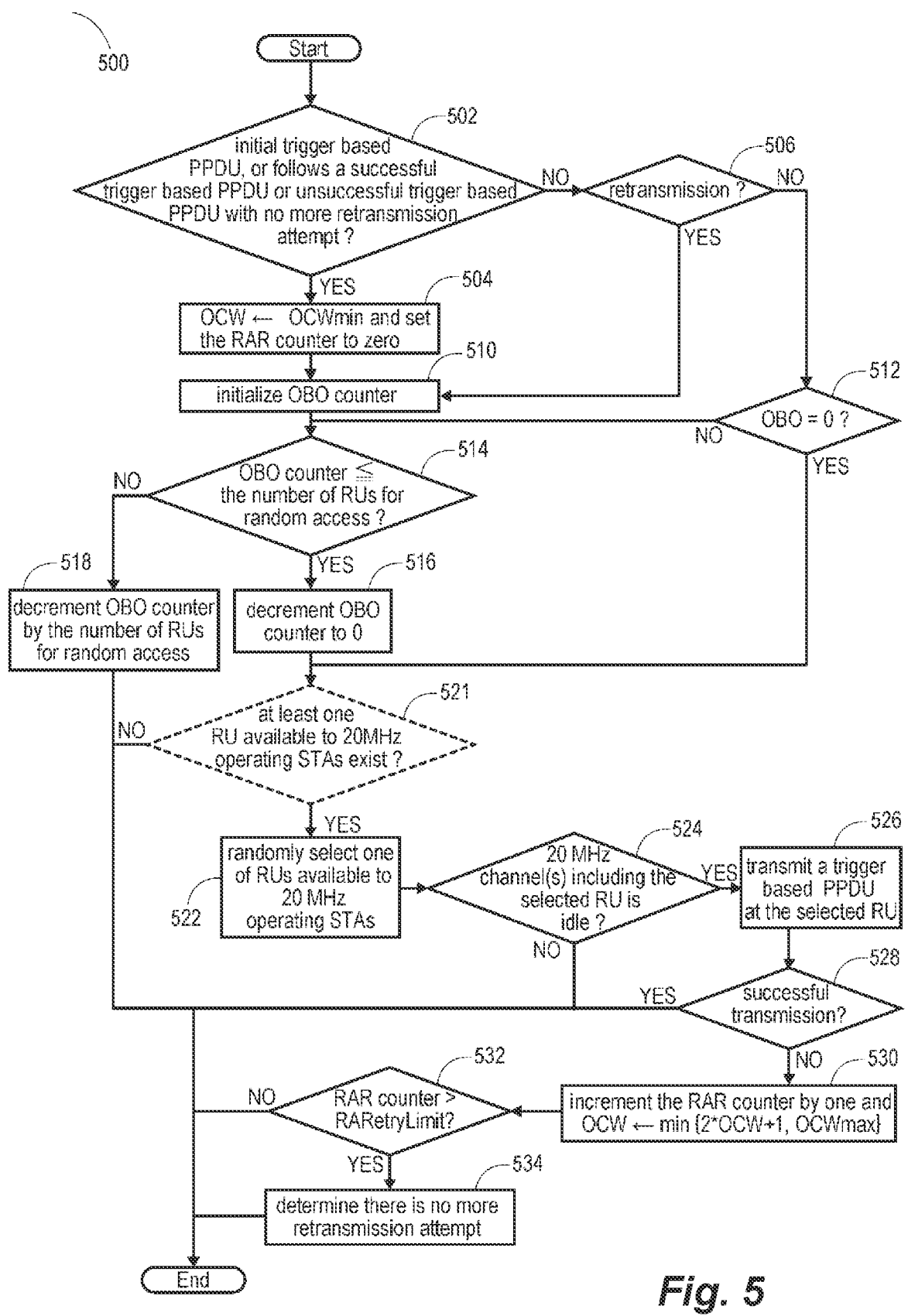
FIG. 5 is a flow chart illustrating a first example UL OFDMA based random access method operated by a 20 MHz operating STA according to a first embodiment of the present disclosure.

FIG. 5 illustrates a first example UORA method 500 operated by a 20 MHz operating STA according to the first embodiment of the present disclosure. The UORA method 500 starts when the 20 MHz operating STA receives a Trigger frame for random access from the AP 110. At step 502, the 20 MHz operating STA determines if its UL transmission is an initial trigger based PPDU transmission, or follows a successful trigger based PPDU transmission, or follows an unsuccessful triggered based PPDU transmission for which there is no more retransmission attempt. If its UL transmission is an initial trigger based PPDU transmission, or follows a successful trigger based PPDU transmission, or follows an unsuccessful triggered based PPDU transmission for which there is no more retransmission attempt, the 20 MHz operating STA sets the value of OCW to OCWmin and sets the RAR (Random Access Retry) counter to zero at step 504 where the RAR counter is an internal counter maintained by the STA, which is purposed to keep track of the retransmission attempt of a failed trigger-based PPDU transmission. Otherwise the 20 MHz operating STA continues to check if its UL transmission is retransmission of an unsuccessful trigger based PPDU transmission at step 506. If its UL transmission is retransmission of an unsuccessful trigger based PPDU transmission, the UORA method 500 proceeds to step 510. Otherwise the UORA method 500 jumps to step 512.

At step 510, the 20 MHz operating STA initializes its OBO counter to a random value in the range of zero and OCW and the UORA method 500 goes to step 514. At step 512, the 20 MHz operating STA determines if its OBO counter is equal to zero. If its OBO counter is equal to zero, this implies the 20 MHz operating STA won the contention and selected one of the RUs for random access in the previously received Trigger frame and but did not transmit a trigger-based PPDU in the previously selected RU since one or more 20 MHz channels containing the previously selected RU are considered busy, and the UORA method 500 goes to step 521. If its OBO counter is not equal to zero, this implies that the 20 MHz operating STA did not win the contention to access the RUs for random access in the previously received Trigger frame and the UORA method 500 goes to step 514.

At step 514, the 20 MHz operating STA checks if its OBO counter is not larger than the number of RUs for random access in the received Trigger frame. If its OBO counter is not larger than the number of RUs for random access in the received Trigger frame, the 20 MHz operating STA decrements its OBO counter to zero at step 516, which implies it wins the random access contention, and the UORA method 500 jumps to step 521. Otherwise the 20 MHz operating STA decrements its OBO counter by the number of RUs for random access in the received Trigger frame at step 518, and then the UORA method 500 just stops. Notice that step 514 to step 518 of the UORA method 500 perform random access contention in an more efficient manner than step 214 to step 220 of the UORA method 200 since one less step is required for the UORA method 500 than the UORA method 200.

At step 521, the 20 MHz operating STA determines if at least one RU for random access which is available to 20 MHz operating STAs exists in the received Trigger frame. Step 521 can be skipped if every Trigger frame for random access contains at least one RU for random access which is available to 20 MHz operating STAs. If at least one RU for random access which is available to 20 MHz operating STAs exists in the received Trigger frame, the UORA method 500 goes to step 522. Otherwise the UORA method 500 just stops.

At step 522, the 20 MHz operating STA randomly selects one of the RU(s) for random access which is available to 20 MHz operating STAs in the received Trigger frame. At step 524, the 20 MHz operating STA checks if each of one or more 20 MHz channels including the selected RU is idle as a result of both physical and virtual carrier sensing. If each of one or more 20 MHz channels including the selected RU is idle, the 20 MHz operating STA transmits a trigger based PPDU at the selected RU at step 526. Otherwise the UORA method 500 just stops. Notice that step 524 of the UORA method 500 is different from step 224 of the UORA method 200 since it is more practical for the 20 MHz operating STA to check the CCA (Clear Channel Assessment) of one or more 20 MHz channels than an RU.

At step 528, the 20 MHz operating STA determines if the trigger-based PPDU is successfully transmitted at the selected RU. If the trigger-based PPDU transmitted at the selected RU solicits an immediate response and the expected response is not received, the transmission is considered unsuccessful and the UORA method 500 goes to step 530. Otherwise the transmission is considered successful and the UORA method 500 just stops. If the trigger-based PPDU transmitted at the selected RU does not solicit an immediate response, the transmission is also considered successful. At step 530, the 20 MHz operating STA increments the RAR counter by one and sets the value of OCW to the minimum of the current value of OCW multiplied by two plus one and OCWmax. At step 532, the 20 MHz operating STA determines if the RAR counter is larger than a threshold termed as RARetryLimit, which indicates the maximum number of random access retransmission attempts. If the RAR counter is not larger than the threshold RARetryLimit, the UORA method 500 just stops. Otherwise the 20 MHz operating STA determines there is no more retransmission attempt at step 534 and then the UORA method 500 just stops.

Notice that the first example UORA method 500 differs from the example UORA method 200 in that the former requires a 20 MHz operating STA to maintain a RAR counter, which enables the 20 MHz operating STA to reset the OCW to OCWmin if its UL transmission follows an unsuccessful trigger-based PPDU transmission for which there is no more retransmission attempt. This may increase its probability of winning the random access contention and transmitting a trigger-based PPDU successfully in a randomly selected RU when receiving the Trigger frame for random access following a couple of failed consecutive retransmission attempts.

Figure 6:
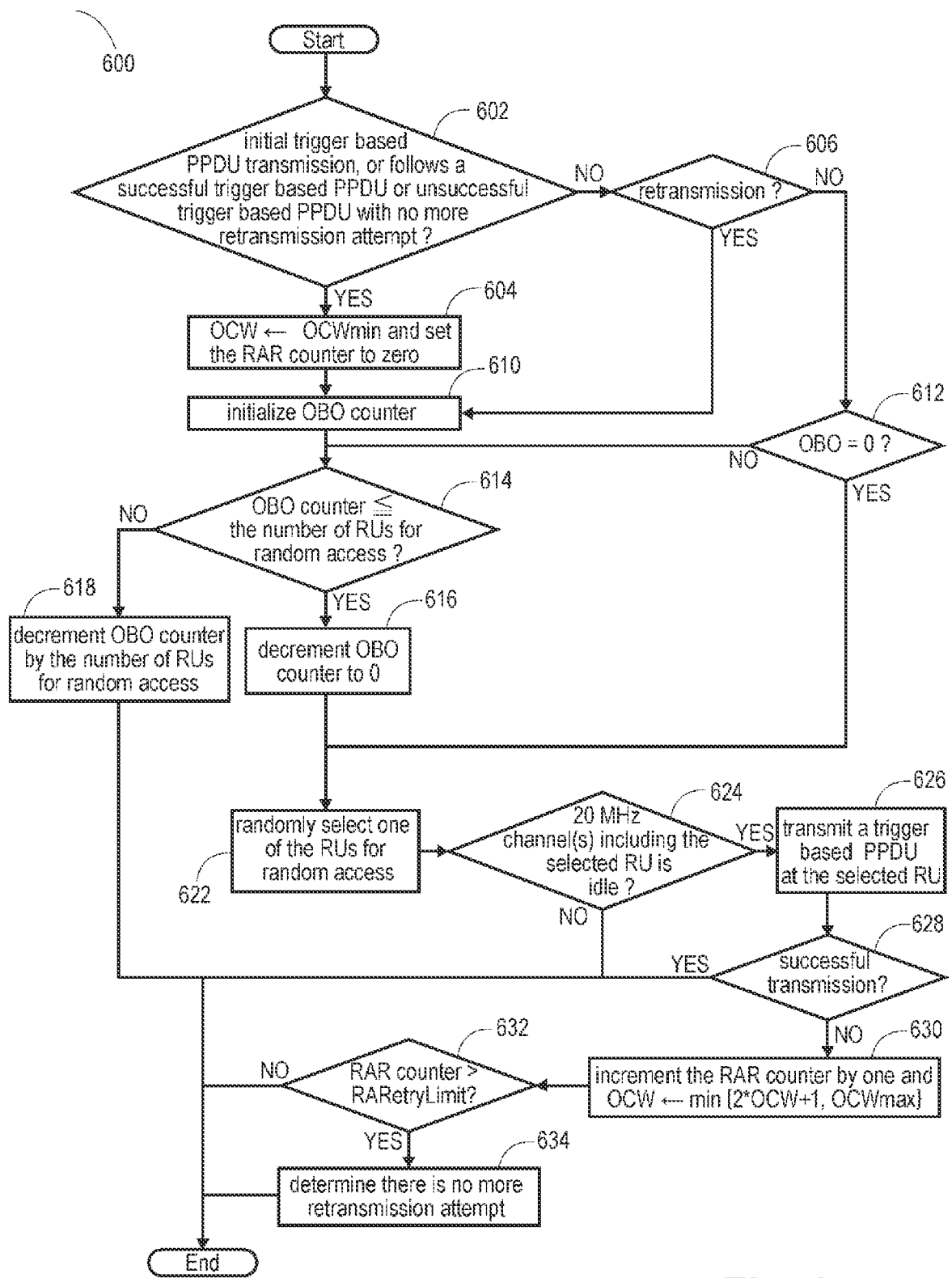
FIG. 6 is a flow chart illustrating an example UL OFDMA based random access method operated by a non-20 MHz operating STA according to the first embodiment of the present disclosure.

FIG. 6 illustrates an example UORA method 600 operated by a non-20 MHz operating STA according to the first embodiment of the present disclosure. The UORA method 600 starts when the non-20 MHz operating STA receives a Trigger frame for random access from the AP 110. Step 602 to step 618 are the same as step 502 to step 518 in the UORA method 500 as shown in FIG. 5, respectively.

At step 622, the non-20 MHz operating STA randomly selects one of the RU(s) for random access in the received Trigger frame. Step 624 to step 634 are the same as step 524 to step 534 in the UORA method 500 as shown in FIG. 5, respectively.

Notice that similar to the example UORA method 500 of FIG. 5, the example UORA method 600 differs from the example UORA method 200 in that the former requires a non-20 MHz operating STA to maintain a RAR counter, which enables the non-20 MHz operating STA to reset the OCW to OCWmin if its UL transmission follows an unsuccessful trigger-based PPDU transmission for which there is no more retransmission attempt. This may increase its probability of winning the random access contention and transmitting a trigger-based PPDU successfully in a randomly selected RU when receiving the Trigger frame for random access following a couple of failed consecutive retransmission attempts.

Figure 7:
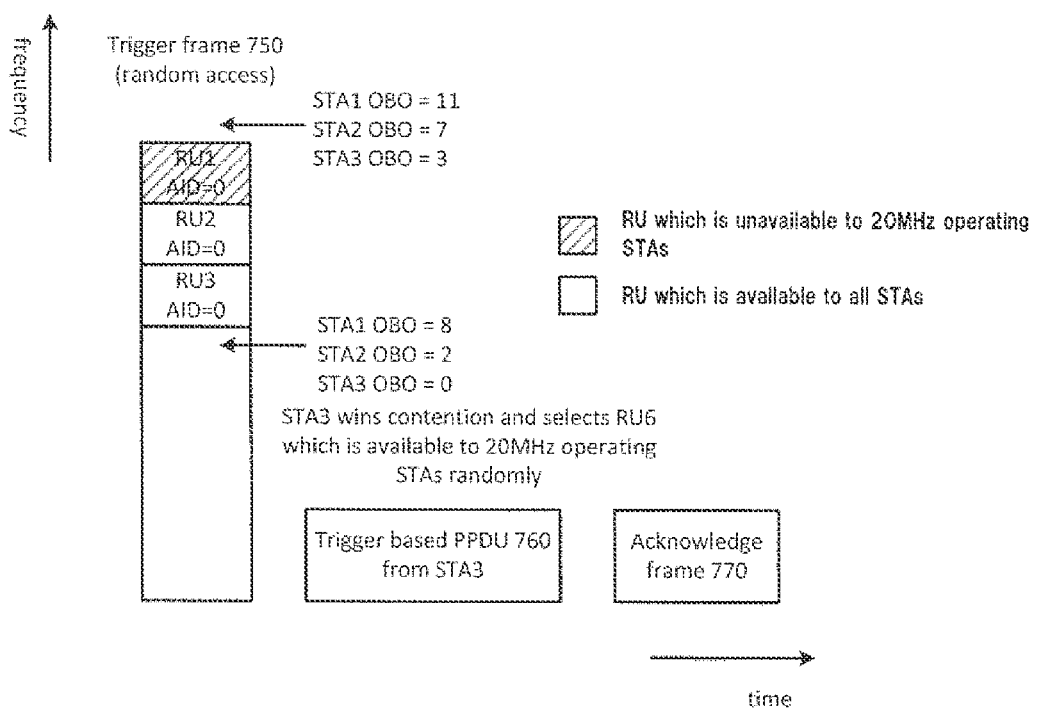
FIG. 7 is a diagram illustrating first example multi-user frame exchange related to UL OFDMA based random access according to the first embodiment of the present disclosure.

FIG. 7 illustrates first example multi-user frame exchange related to UORA according to the first embodiment of the present disclosure. STA1 and STA2 are non-20 MHz operating STAs and content for UL transmission using the UORA method 600, while STA3 is a 20 MHz operating STA and contents for UL transmission using the UORA method 500. STA1 and STA2 start the UORA method 600 and STA3 starts the UORA method 500 when receiving the Trigger frame 750 that contains three RUs for random access (i.e., RU1, RU2 and RU3 with AID set to zero) from the AP where RU1 is unavailable to 20 MHz operating STAs. Assume that UL transmission for each of STA1, STA2 and STA3 is an initial Trigger-based PPDU transmission or follows a successful Trigger based PPDU transmission, and the OBO counters for STA1, STA2 and STA3 are initialized to 11, 5 and 3, respectively. Since the number of RUs for random access in the received Trigger frame 750 is three, the OBO counters for STA1, STA2 and STA3 becomes 8, 2 and 0, respectively. Eventually STA3 with its OBO counter being 0 wins the random access contention and randomly selects RU3 which is available to 20 MHz operating STAs. If each of one or more 20 MHz channels including RU3 is considered idle, STA3 transmits a Trigger-based PPDU 760 at RU3 SIFS after receiving the Trigger frame 750. If STA3 receives an acknowledge frame 770 from the AP within a determined time period after transmitting the Trigger based PPDU 760, the transmission of the Trigger based PPDU 760 is successful. Otherwise the transmission of the Trigger based PPDU 760 is unsuccessful.

Figure 8:
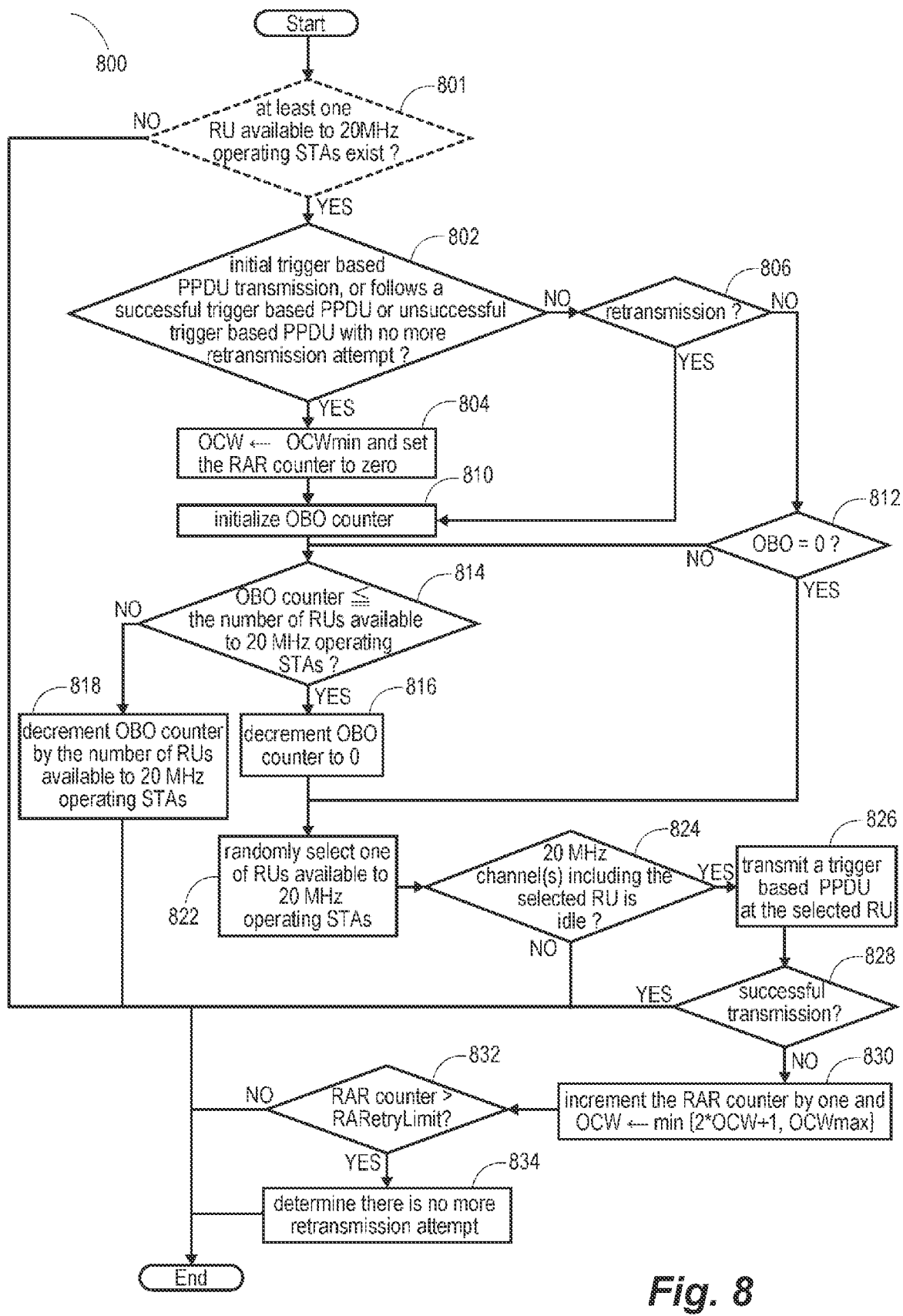
FIG. 8 is a flow chart illustrating a second example UL OFDMA based random access method operated by a 20 MHz operating STA according to the first embodiment of the present disclosure.

FIG. 8 illustrates a second example UORA method 800 operated by a 20 MHz operating STA according to the first embodiment of the present disclosure. The UORA method 800 starts when the 20 MHz operating STA receives a Trigger frame for random access from the AP.

At step 801, the 20 MHz operating STA determines if at least one RU for random access which is available to 20 MHz operating STAs exists in the received Trigger frame. Step 801 can be skipped if every Trigger frame for random access contains at least one RU for random access which is available to 20 MHz operating STAs. If at least one RU for random access which is available to 20 MHz operating STAs exists in the received Trigger frame, the UORA method 800 goes to step 802. Otherwise the UORA method 800 just stops.

Step 802 to step 812 are the same as step 502 to step 512 in the UORA method 500 as shown in FIG. 5, respectively.

At step 814, the 20 MHz operating STA checks if its OBO counter is not larger than the number of RUs for random access which are available to 20 MHz operating STAs in the received Trigger frame. If its OBO counter is not larger than the number of RUs for random access which are available to 20 MHz operating STAs in the received Trigger frame, the 20 MHz operating STA decrements its OBO counter to zero at step 816, which implies it wins the random access contention, and the UORA method 800 jumps to step 822. Otherwise the 20 MHz operating STA decrements its OBO counter by the number of RUs for random access which are available to 20 MHz operating STAs in the received Trigger frame at step 818 and then the UORA method 800 just stops.

Notice that the second example UORA method 800 in FIG. 8 differs from the first example UORA method 500 in FIG. 5 in that for the former method, a 20 MHz operating STA only takes into account the RUs for random access which are available to 20 MHz operating STAs in the random access contention. As a result, the former method enables a 20 MHz operating STA to decrement its OBO counter more slowly and thus its opportunity of winning the random access contention is reduced.

Step 822 to step 834 in FIG. 8 is the same as step 522 to step 534 in FIG. 5 in the UORA method 500 as shown in FIG. 5, respectively.

Figure 9:
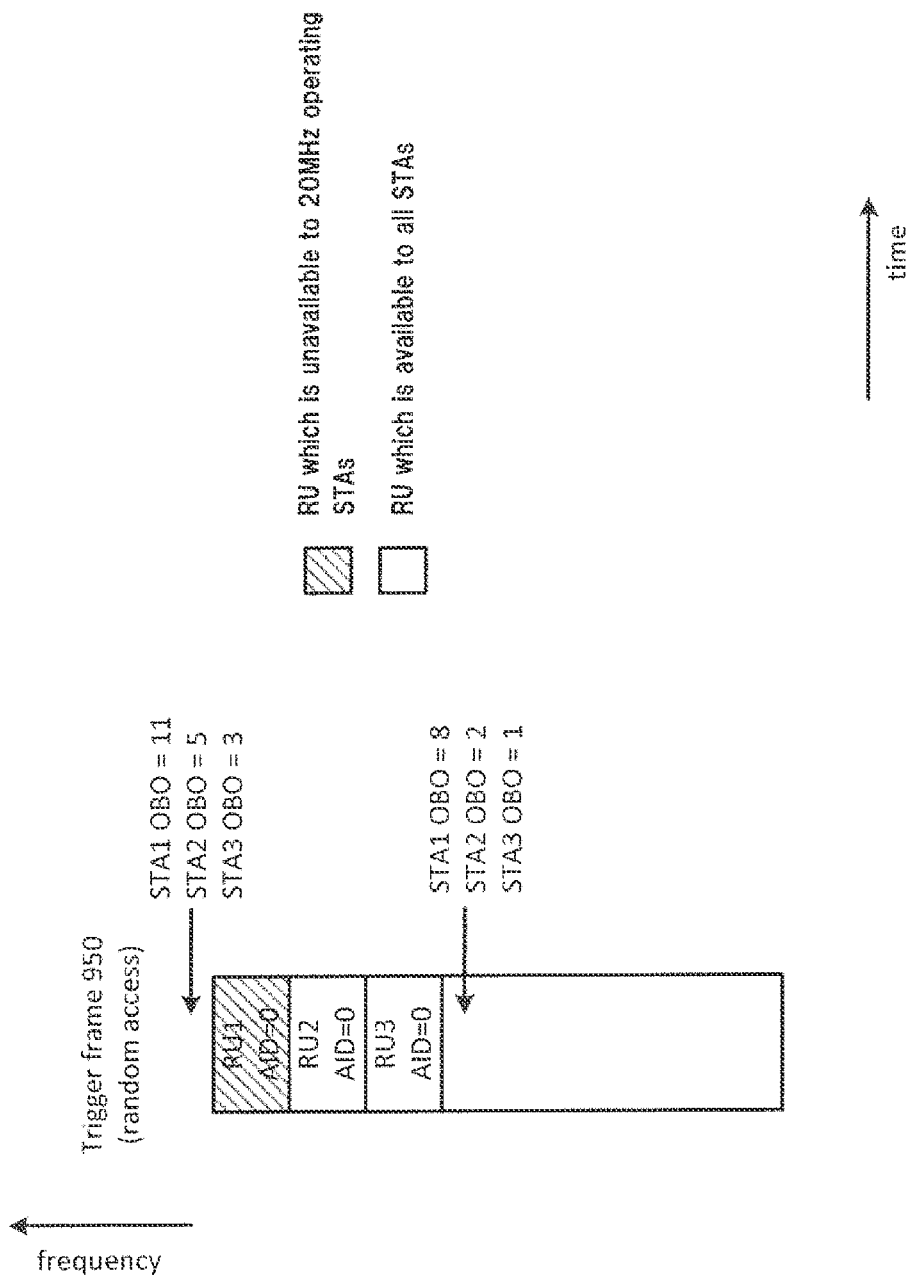
FIG. 9 is a diagram illustrating second example multi-user frame exchange related to UL OFDMA based random access according to the first embodiment of the present disclosure.

FIG. 9 illustrates second example multi-user frame exchange related to UORA according to the first embodiment of the present disclosure. STA1 and STA2 are non-20 MHz operating STAs and content for UL transmission using the UORA method 600 of FIG. 8, while STA3 is a 20 MHz operating STA and contents for UL transmission using the UORA method 800 of FIG. 8. STA1 and STA2 start the UORA method 600 and STA3 starts the UORA method 800 when receiving the Trigger frame 950 that contains three RUs for random access (i.e., RU1, RU2 and RU3 with AID set to zero) from the AP where RU1 is unavailable to 20 MHz operating STAs. Assume that UL transmission for each of STA1, STA2 and STA3 is an initial Trigger-based PPDU transmission or follows a successful Trigger based PPDU transmission, and the OBO counters for STA1, STA2 and STA3 are initialized to 11, 5 and 3, respectively. Since the number of RUs for random access in the received Trigger frame 950 is three and the number of RUs for random access which is available to 20 MHz operating STAs in the received Trigger frame 950 is two, the OBO counters for STA1, STA2 and STA3 becomes 8, 2 and 1, respectively. Eventually no any STA wins the random access contention.

Figure 10:
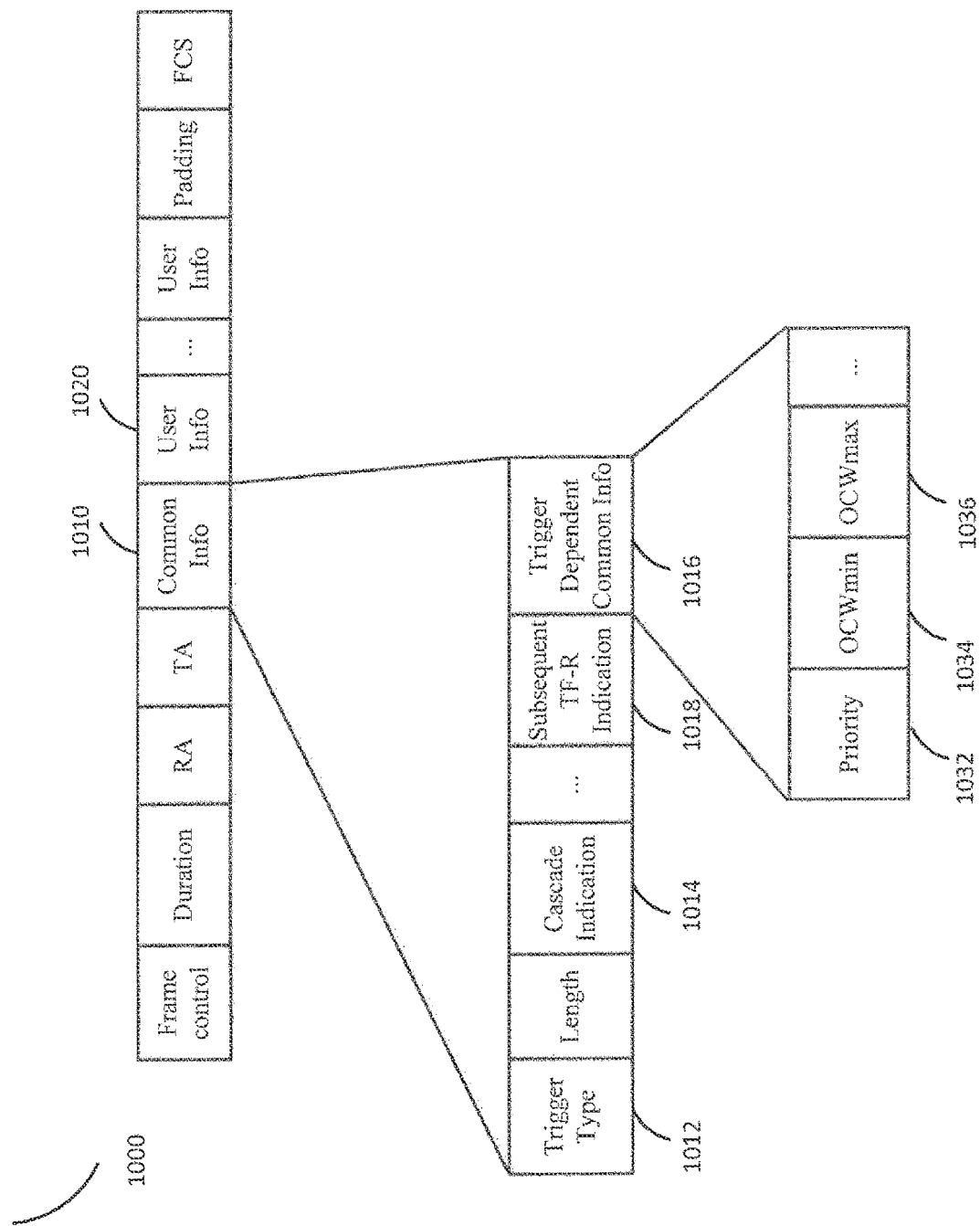
FIG. 10 is a diagram illustrating an example format of the Trigger frame according to the first embodiment of the present disclosure.

FIG. 10 illustrates an example format of the Trigger frame 1000 according to the first embodiment of the present disclosure. The Trigger frame 1000 comprises a Common Info field 1010 and one or more User Info field 1020. The Common Info field 1010 comprises a Trigger Type subfield 1012, a Cascade Indication subfield 1014 and a Trigger Dependent Common Info subfield 1016. The Trigger Type subfield 1012 and the Cascade Indication subfield 1014 are the same as their respective counterparts 412 and 414 in the Trigger frame 400 as illustrated in FIG. 400. The Trigger Dependent Common Info subfield 1016 further comprises a Priority subfield 1032, which indicates the priority of 20 MHz operating STAs. For example, the Priority subfield 1032 sets to 0 to indicate that 20 MHz operating STAs have less priority than non-20 MHz operating STAs;

the Priority subfield 1032 sets to 1 to indicate that 20 MHz operating STAs have higher priority than non-20 MHz operating STAs; and the Priority subfield 1032 sets to 2 to indicate that 20 MHz operating STAs have the same priority as non-20 MHz operating STAs.

Figure 11:
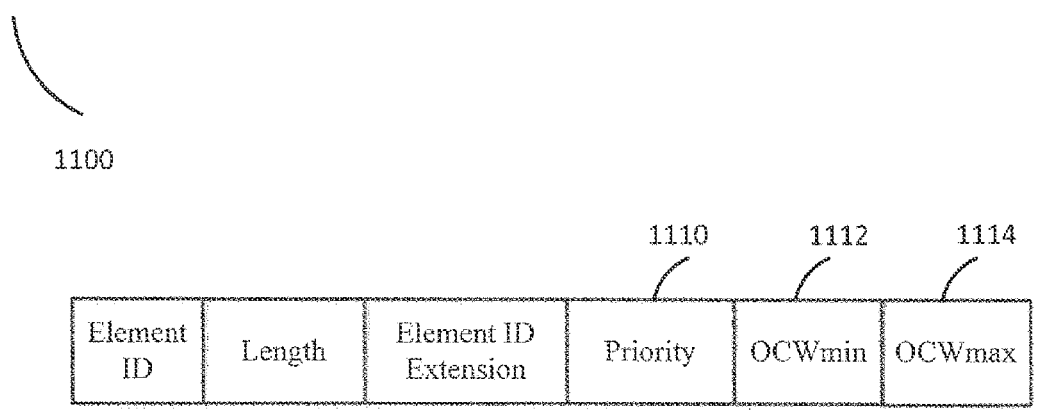
FIG. 11 is a diagram illustrating an example format of the UL OFDMA based random access parameter element according to the first embodiment of the present disclosure.

Alternatively, priority signaling can be broadcasted in the Beacon frame or a Probe Response frame. FIG. 11 illustrates an example format of a UORA Parameter element 1100 included in the Beacon frame or the Probe Response frame according to the first embodiment of the present disclosure. The UORA element 1100 comprises a Priority field 1110 which indicates the priority of 20 MHz operating STAs in the same manner as the Priority subfield 1032 of FIG. 10.

According to the first embodiment of the present disclosure, whether a 20 MHz operating STA uses the first example UORA method 500 or the second example UORA method 800 depends on the priority signaling broadcasted in the Trigger frame for random access or in the UORA parameter element included in the Beacon frame or the Probe Response frame. For example, if 20 MHz operating STAs have lower priority than non-20 MHz operating STAs, the second UORA method 800 is used by a 20 MHz operating STA. Otherwise the first example UORA method 500 is used by a 20 MHz operating STA. As a result, a 20 MHz operating STA is able to optimize its UORA operation according to its priority.

According to the first embodiment of the present disclosure, in the Trigger frame for random access or in the UORA parameter element included in the Beacon frame or the Probe Response frame, the AP may broadcast multiple value pairs of OCWmin and OCWmax, each of which is assigned to STAs with a specific priority. For example, the AP may broadcast two value pairs of OCWmin and OCWmax. A first value pair of OCWmin and OCWmax is assigned to STAs with higher priority and a second value pair of OCWmin and OCWmax is assigned to STAs with lower priority. If 20 MHz operating STAs have higher priority than non-20 MHz operating STAs, the first value pair of OCWmin and OCWmax is assigned to 20 MHz operating STAs and the second value pair of OCWmin and OCWmax is assigned to non-20 MHz operating STAs, vice versa. An STA is able to know its values of OCWmin and OCWmax based on its priority indicated in the Trigger frame for random access or in the UORA parameter element included in the Beacon frame or the Probe Response frame. Basically STAs with higher priority have smaller values of OCWmin and OCWmax than STAs with lower priority. As a result, STAs with higher priority may have higher probability of winning the random access contention with the UORA method 500, the UORA method 600 or the UORA method 800.

Alternatively, in the Trigger frame for random access or in the UORA parameter element included in the Beacon frame or the Probe Response frame, the AP may broadcast a single value pair of OCWmin and OCWmax, which is assigned to STAs with a specific priority, e.g., the OCWmin subfield 1034 and the OCWmax subfield 1036 in the Trigger Dependent Common Info subfield 1016 of the Trigger frame 1000 as illustrated in FIG. 10 or the OCWmin field 1112 and the OCWmax field 1114 in the UORA parameter element 1100 as illustrated in FIG. 11. The values of OCWmin and OCWmax for STAs with another priority can be derived from the broadcasted value of OCWmin and OCWmax. For example, the AP may broadcast a single value pair of OCWmin and OCWmax for STAs with higher priority. If 20 MHz operating STAs have higher priority than non-20 MHz operating STAs, the broadcasted value pair of OCWmin and OCWmax is assigned to 20 MHz operating STAs and the value pair of OCWmin and OCWmax for non-20 MHz operating STAs is equal to the value pair of OCWmin and OCWmax for 20 MHz operating STAs plus a determined positive integer.

Second Embodiment

According to a second embodiment of the present disclosure, a first example UORA method operated by the AP is that every N-th Trigger frame for random access transmitted by the AP includes at least one RU for random access which is available to 20 MHz operating STAs, where N is a positive integer. A Trigger frame may include at least one RU for random access which is available to 20 MHz operating STAs and may also include at least one RU for random access which is unavailable to 20 MHz operating STAs. In this Trigger frame, the at least one RU for random access which is available to 20 MHz operating STAs is restricted from being used for non-20 MHz operating STAs. And the number of RUs for random access which are restricted from being used for non-20 MHz operating STAs is the same as the number of RUs for random access which is unavailable to 20 MHz operating STAs.

According to the second embodiment of the present disclosure, a second example UORA method operated by the AP is that in a determined period of time (e.g., one Beacon interval), the AP transmits one or more Trigger frame for random access, each including at least one RU for random access which is available to 20 MHz operating STAs. In a Trigger frame including at least one RU for random access which is available to 20 MHz operating STAs and at least one RU for random access which is unavailable to 20 MHz operating STAs, the at least one RU for random access which is available to 20 MHz operating STAs is restricted from being used for non-20 MHz operating STAs and the number of RUs for random access which are restricted from being used for non-20 MHz operating STAs is the same as the number of RUs for random access which is unavailable to 20 MHz operating STAs.

According to the second embodiment of the present disclosure, a 20 MHz operating STA is given an opportunity to reach the AP with the UORA mechanism when receiving Trigger frames for random access. Furthermore, after winning the random access contention, probability of successful transmission in a selected RU for a 20 MHz operating STA can be similar to that of a non-20 MHz operating STA.

Figure 12:
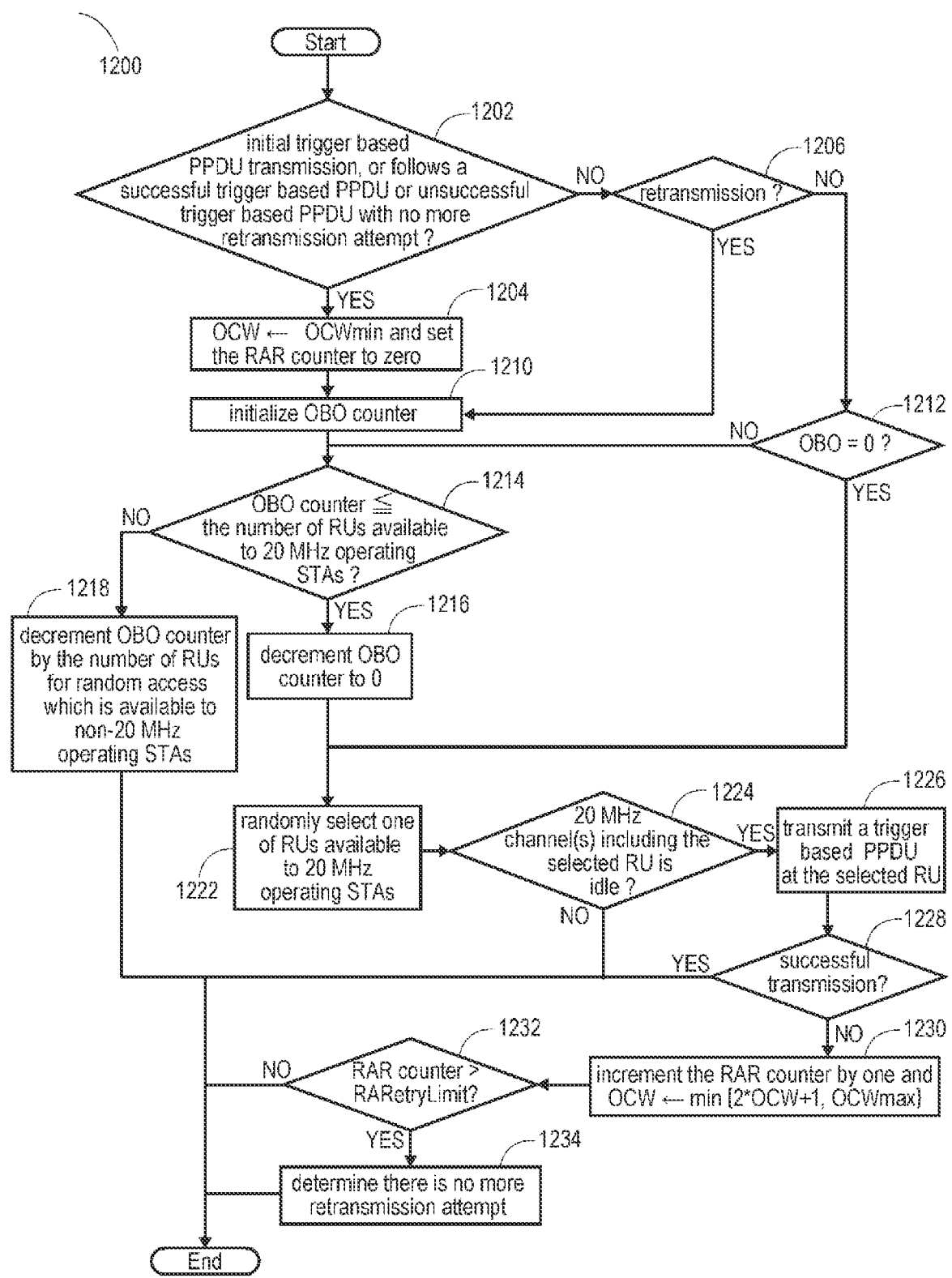
FIG. 12 is a flow chart illustrating a first example UL OFDMA based random access method operated by a non-20 MHz operating STA according to a second embodiment of the present disclosure.

FIG. 12 illustrates a first example UORA method 1200 operated by a non-20 MHz operating STA according to the second embodiment of the present disclosure. The UORA method operated by a 20 MHz operating STA is the same as the UORA method 500 as shown in FIG. 5 or the UORA method 800 as shown in FIG. 8. The UORA method 1200 of FIG. 12 starts when the non-20 MHz operating STA receives a Trigger frame for random access from the AP.

Step 1202 to step 1218 are the same as step 502 to step 518 in the UORA method 500 as shown in FIG. 5, respectively.

At step 1222, the non-20 MHz operating STA randomly selects one of the RUs for random access which is available to non-20 MHz operating STAs in the received Trigger frame.

Step 1224 to step 1234 are the same as step 524 to step 534 in the UORA method 500 as shown in FIG. 5, respectively.

Figure 13:
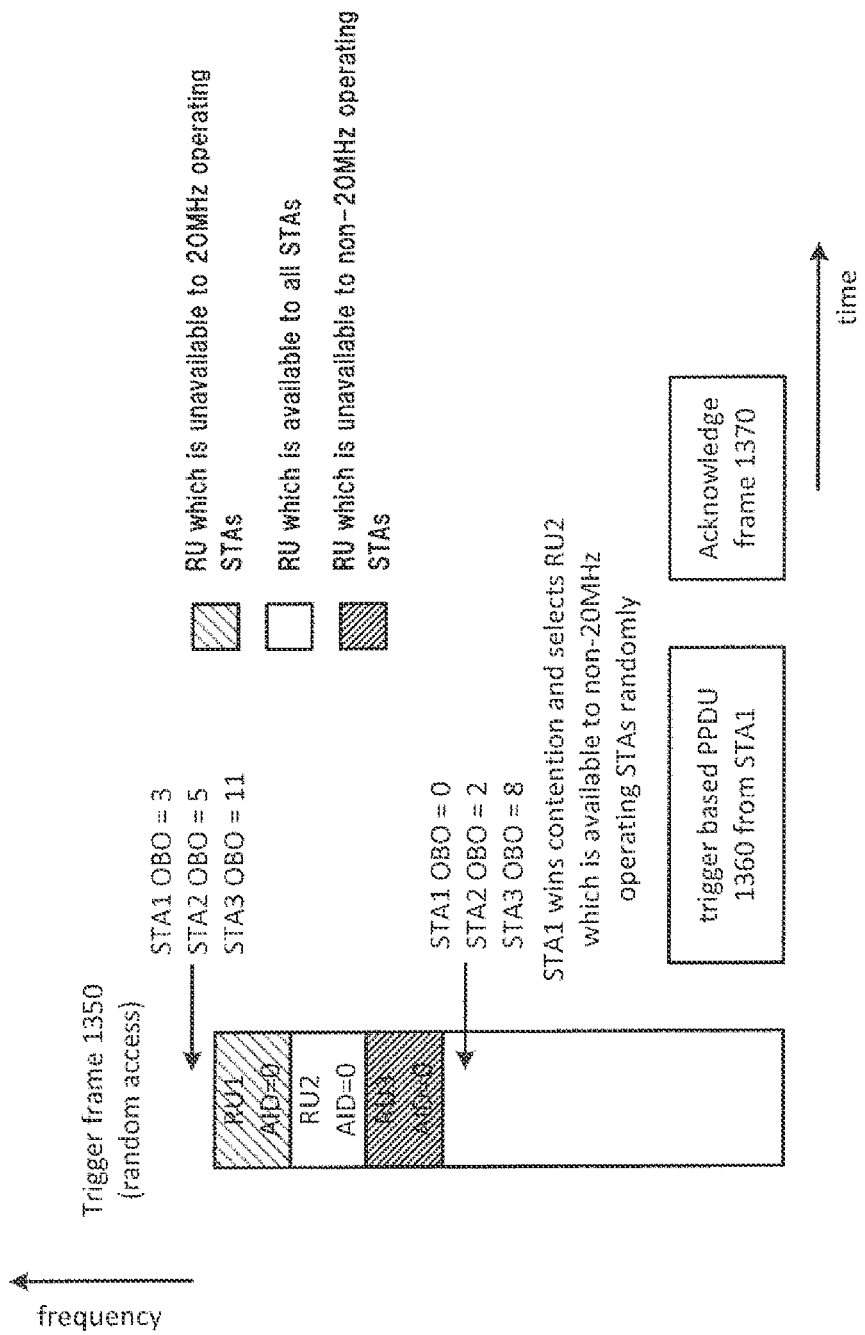
FIG. 13 is a diagram illustrating first example multi-user frame exchange related to UL OFDMA based random access according to the second embodiment of the present disclosure.

FIG. 13 illustrates first example multi-user frame exchange related to UORA according to the second embodiment of the present disclosure. STA1 and STA2 are non-20 MHz operating STAs and contend for UL transmission using the UORA method 1200, while STA3 is a 20 MHz operating STA and contends for UL transmission using the UORA method 500. STA1 and STA2 start the UORA method 1200 and STA3 starts the UORA method 500 when receiving the Trigger frame 1350 that contains three RUs for random access (i.e., RU1, RU2 and RU3 with AID set to zero) from the AP where RU1 is unavailable to 20 MHz operating STAs and RU3 is unavailable to non-20 MHz operating STAs. Assume that UL transmission for each of STA1, STA2 and STA3 is an initial Trigger-based PPDU transmission or follows a successful Trigger based PPDU transmission, and the OBO counters for STA1, STA2 and STA3 are initialized to 3, 5 and 10, respectively. Since the number of RUs for random access in the received Trigger frame 1350 is three, the OBO counters for STA1, STA2 and STA3 becomes 0, 2 and 8, respectively. Eventually STA1 with its OBO counter being 0 wins the random access contention and randomly selects RU2 which is available to non-20 MHz operating STAs. If each of one or more 20 MHz channels including the RU2 is considered idle, STA1 transmits a Trigger-based PPDU 1360 at RU2 SIFS after receiving the Trigger frame 1350. If STA1 receives an acknowledge frame 1370 from the AP within a determined time period after transmitting the Trigger based PPDU 1360, the transmission of the Trigger based PPDU 1360 is successful. Otherwise the transmission of the Trigger based PPDU 1360 is unsuccessful.

Figure 14:
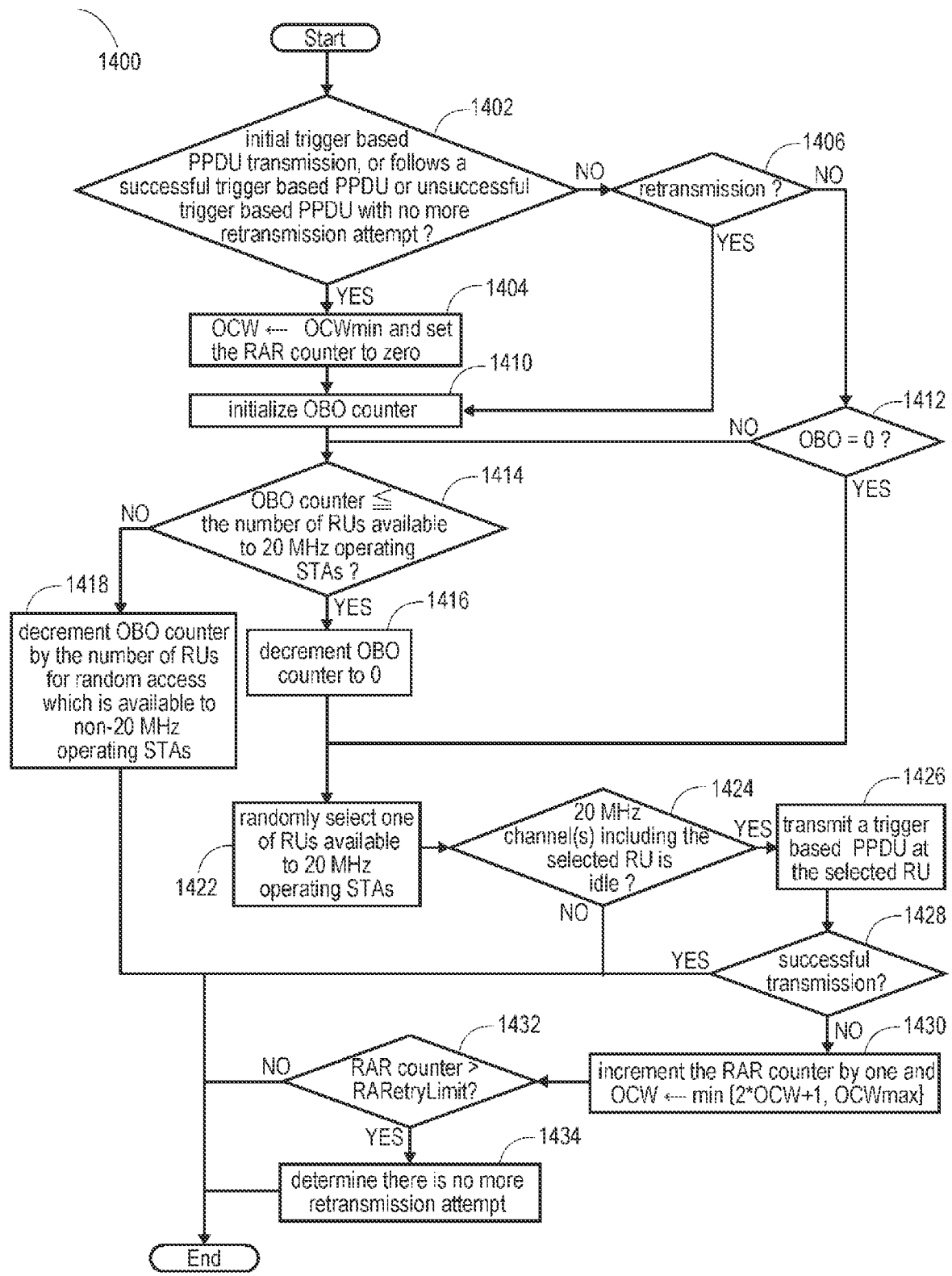
FIG. 14 is a flow chart illustrating a second example UL OFDMA based random access method operated by a non-20 MHz operating STA according to the second embodiment of the present disclosure.

FIG. 14 illustrates a second example UORA method 1400 operated by a non-20 MHz operating STA according to the second embodiment of the present disclosure. The UORA method 1400 starts when the non-20 MHz operating STA receives a Trigger frame for random access from the AP.

Step 1402 to step 1412 in FIG. 14 are the same as step 502 to step 512 in the UORA method 500 as shown in FIG. 5, respectively.

At step 1414, the non-20 MHz operating STA checks if its OBO counter is not larger than the number of RUs for random access which is available to non-20 MHz operating STAs in the received Trigger frame. If its OBO counter is not larger than the number of RUs for random access which is available to non-20 MHz operating STAs in the received Trigger frame, the non-20 MHz operating STA decrements its OBO counter to zero at step 1416, which implies it wins the random access contention, and the UORA method 1400 jumps to step 1422. Otherwise the non-20 MHz operating STA decrements its OBO counter by the number of RUs for random access which is available to non-20 MHz operating STAs in the received Trigger frame at step 1418 and then the UORA method 1400 just stops.

Notice that the second example UORA method 1400 in FIG. 14 differs from the first example UORA method 1200 in FIG. 12 in that for the former method, a non-20 MHz operating STA only takes into account the RUs for random access which are available to non-20 MHz operating STAs in the random access contention. As a result, the former method enables a non-20 MHz operating STA to decrement its OBO counter more slowly and thus its opportunity of winning the random access contention is reduced.

At step 1422, the non-20 MHz operating STA randomly selects one of the RUs for random access which is available to non-20 MHz operating STAs in the received Trigger frame.

Step 1424 to step 1434 are the same as step 524 to step 534 in the UORA method 500 as shown in FIG. 5, respectively.

Figure 15:
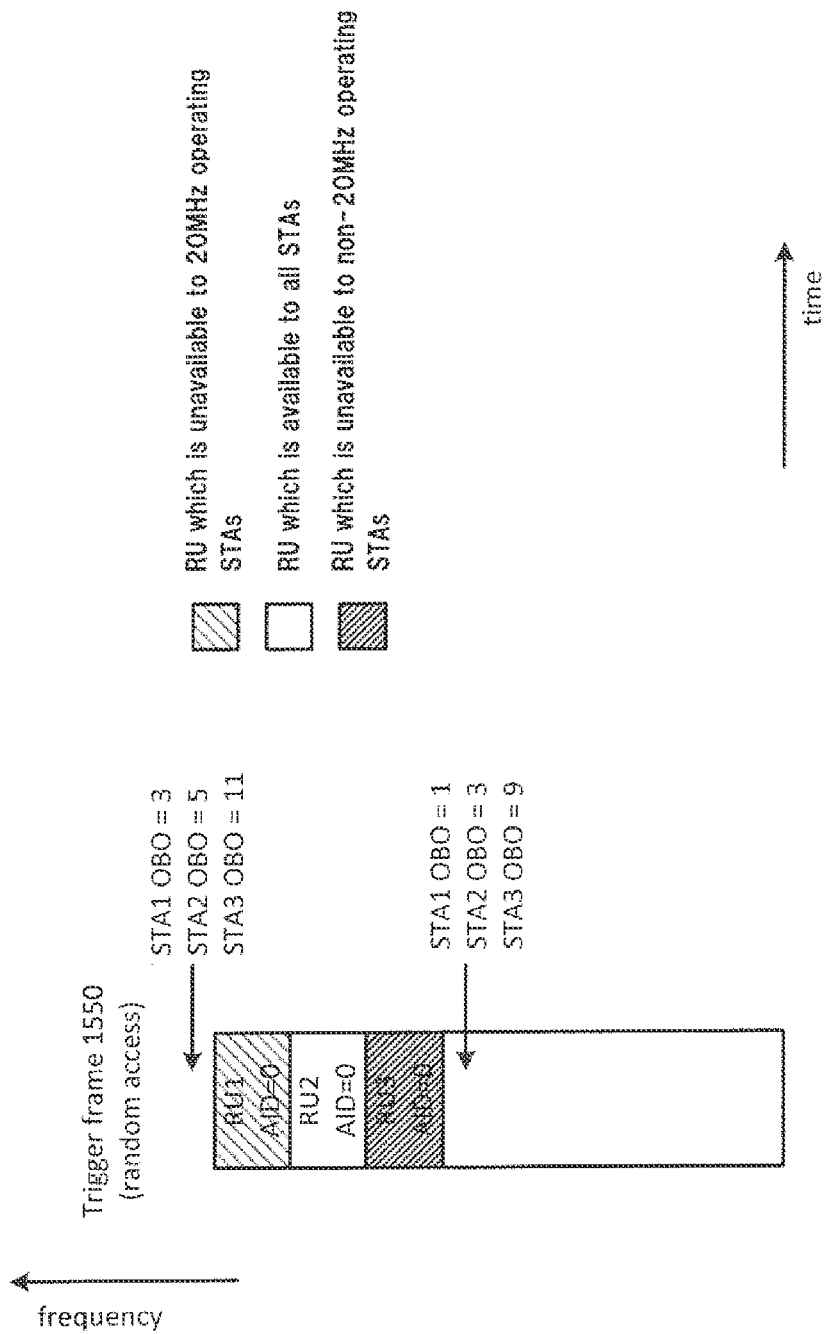
FIG. 15 is a diagram illustrating second example multi-user frame exchange related to UL OFDMA based random access according to the second embodiment of the present disclosure.

FIG. 15 illustrates second example multi-user frame exchange related to UORA according to the second embodiment of the present disclosure. STA1 and STA2 are non-20 MHz operating STAs and content for UL transmission using the UORA method 1400 in FIG. 14, while STA3 is a 20 MHz operating STA and contents for UL transmission using the UORA method 800 in FIG. 8. STA1 and STA2 start the UORA method 1400 and STA3 starts the UORA method 800 when receiving the Trigger frame 1550 that contains three RUs for random access (i.e., RU1, RU2 and RU3 with AID set to zero) from the AP where RU1 is unavailable to 20 MHz operating STAs and RU3 is unavailable to non-20 MHz operating STAs. Assume that UL transmission for each of STA1, STA2 and STA3 is an initial Trigger-based PPDU transmission or follows a successful Trigger based PPDU transmission, and the OBO counters for STA1, STA2 and STA3 are initialized to 3, 5 and 11, respectively. Since the number of RUs for random access in the received Trigger frame 1550 is three, the OBO counters for STA1, STA2 and STA3 becomes 1, 3 and 9, respectively. Eventually no any STA wins the random access contention.

Figure 16:
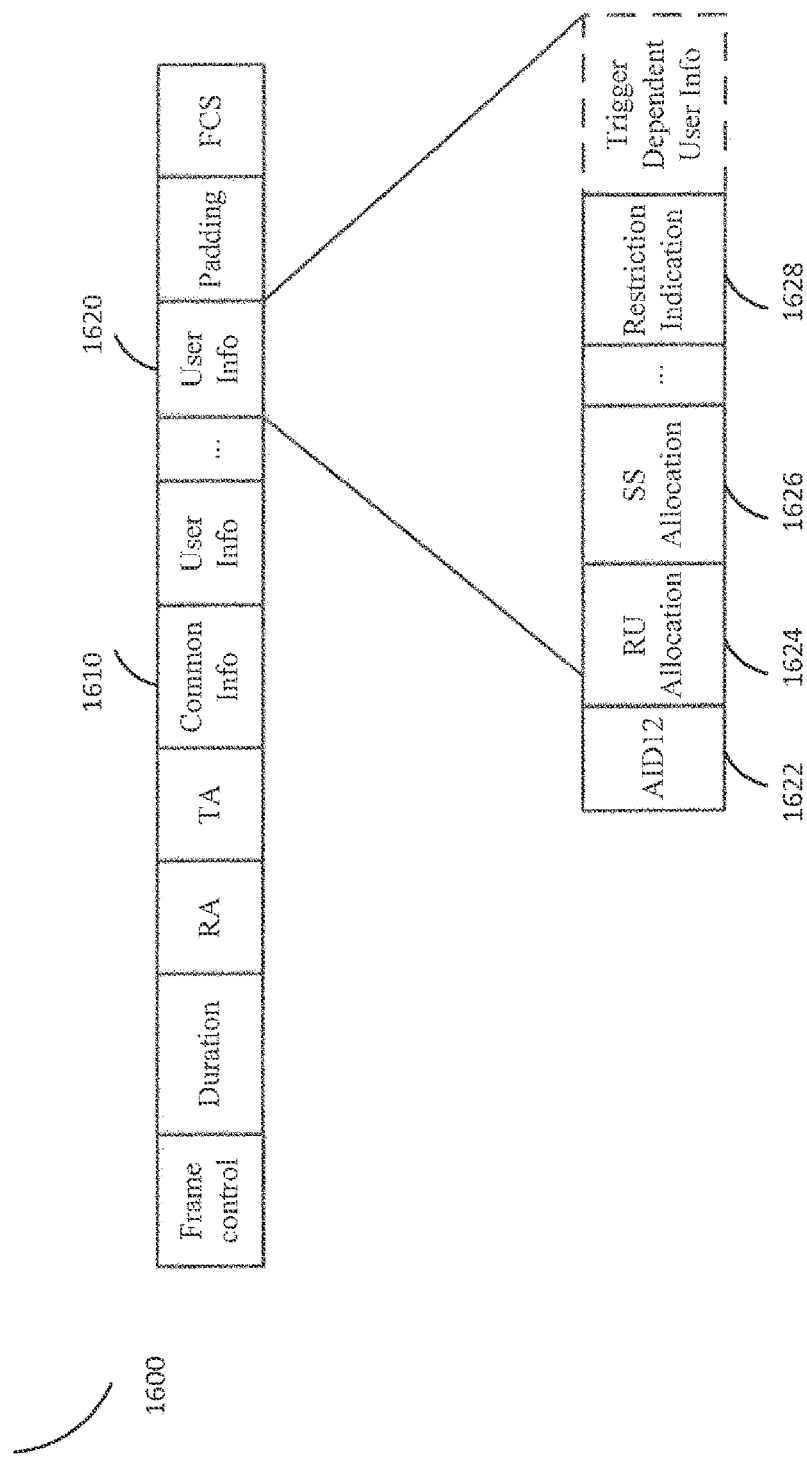
FIG. 16 is a diagram illustrating an example format of the Trigger frame according to the second embodiment of the present disclosure.

FIG. 16 illustrates an example format of the Trigger frame 1600 according to the second embodiment of the present disclosure. The Trigger frame 1600 comprises a Common Info field 1610 and one or more User Info field 1620. The User Info field 1620 comprises an AID12 subfield 1622, an RU Allocation subfield 1624, a SS Allocation subfield 1626 and a Restriction Indication subfield 1628. The AID12 subfield 1622, the RU Allocation subfield 1624 and the SS Allocation subfield 1626 are the same as their respective counterparts 422, 424 and 426 in the Trigger frame 400 as illustrated in FIG. 4. The Restriction Indication subfield 1628 indicates if an RU for random access is restricted to be used for non-20 MHz operating STAs. For example, the Restriction Indication subfield 1628 sets to 0 to indicate that this RU is not restricted to be used for non-20 MHz operating STAs, and the Restriction Indication subfield 1628 sets to 1 to indicate that this RU is restricted to be used for non-20 MHz operating STAs.

<Power Save with UL OFDMA-Based Random Access>

TWT (Target Wake Time) is a 802.11 function that permits the AP to define a specific time or a set of times for STAs to access the medium. The STA and the AP exchange information that includes an expected activity duration to allow the AP to control the amount of contention and overlap among competing STAs. TWT may be used to reduce network energy consumption, as STAs that use it can enter a doze state until their TWT arrives.

Figure 17:
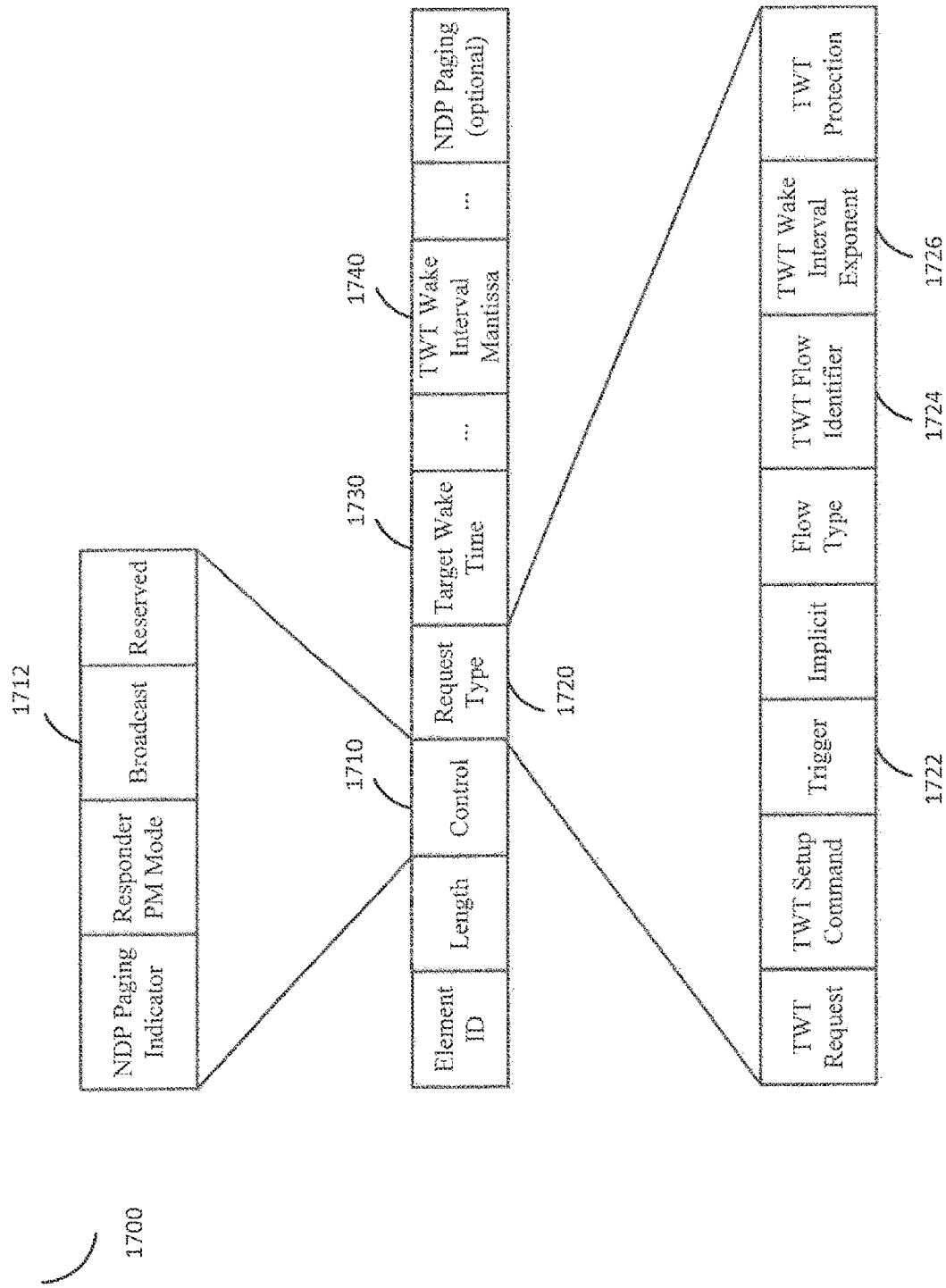
FIG. 17 is a diagram illustrating an example format of a TWT element.

FIG. 17 illustrates an example format of an TWT element 1700. The TWT element 1700 comprises a Control field 1710, a Request Type field 1720, a Target Wake Time field 1730 and a TWT Wake Interval Mantissa field 1740. The Control field 1710 comprises a Broadcast subfield 1712, which indicates if the TWT SP (Service Period) defined by the TWT element 1700 is a broadcast TWT SP. The Broadcast subfield 1712 is 1 to indicate that the TWT SP defined by the TWT element 1700 is a broadcast TWT SP. The Broadcast subfield 1712 is 0, otherwise. The Request Type field 1720 comprises a Trigger subfield 1722, a TWT Flow Identifier subfield 1724 and a TWT Wake Interval Exponent subfield 1726. The Trigger subfield 1722 indicates if the TWT SP defined by the TWT element 1700 includes Trigger frames. The Trigger subfield 1722 is set to 1 to indicate a trigger enabled TWT, namely, at least one Trigger frame is transmitted during the TWT SP. The Trigger subfield 1722 is set to 0 otherwise. For a broadcast TWT SP, the TWT Flow Identifier subfield 1724 contains a value that indicates recommendations on the types of frames that are transmitted by scheduled STAs during the broadcast TWT SP. The TWT Flow Identifier subfield 1724 is set to 0 to indicate no constraints on the frames transmitted during the broadcast TWT SP and a Trigger frame transmitted during the broadcast TWT SP may contain zero or more RU for random access. The TWT Flow Identifier subfield 1724 is set to 1 to indicate that i) there is no constraints on the frames transmitted by the scheduling STA during the broadcast TWT SP, ii) frames transmitted during the broadcast TWT SP by a scheduled STA are recommended to be limited to some specific types of frames (e.g., frames that are sent as part of a sounding feedback exchange; and iii) a Trigger frame transmitted by the AP during the broadcast TWT SP will not contain RUs for random access. The TWT Flow Identifier subfield 1724 is set to 2 to indicate that i) there is no constraints on the frames transmitted by the scheduling STA during the broadcast TWT SP, ii) frames transmitted during the broadcast TWT SP by a scheduled STA are recommended to be limited to some specific types of frames (e.g., frames that are sent as part of a sounding feedback exchange; and iii) a Trigger frame transmitted by the AP during the broadcast TWT SP will contain at least one RU for random access. The TWT wake time of the scheduled STA is determined by the Target Wake Time field 1730 while the TWT wake interval of the scheduled STA is determined by the TWT Wake Interval Mantissa field 1740 and the TWT Wake Interval Exponent subfield 1726.

According to a first example power save mechanism with UORA, an STA that receives a Beacon frame or a management frame containing a TWT element 1700 may enter the doze state until the start of the TWT SP defined by the TWT element 1700. This TWT element 1700 includes the Broadcast subfield 1712 set to 1 and the TWT Flow Identifier subfield 1724 set to 2.

According to a second example power save mechanism with UORA, if random access allocations are made in a sequence of Trigger frames within a trigger enabled TWT SP, then all the Trigger frames in the sequence shall have the Cascade Indication field set to 1, except for the last Trigger frame in the sequence, which shall have the Cascade Indication field set to 0. An STA may use the value indicated in the Cascade Indication field in a Trigger frame to enter the doze state. If its OBO counter decrements to a non-zero value with the random access procedure in a Trigger frame with Cascade Indication field set to 0, it may enter the doze state immediately. If its OBO counter decrements to a non-zero value with the random access procedure in a Trigger frame with Cascade Indication field set to 1, it may remain awake for random access in the cascaded Trigger frame.

Third Embodiment

Figure 18:
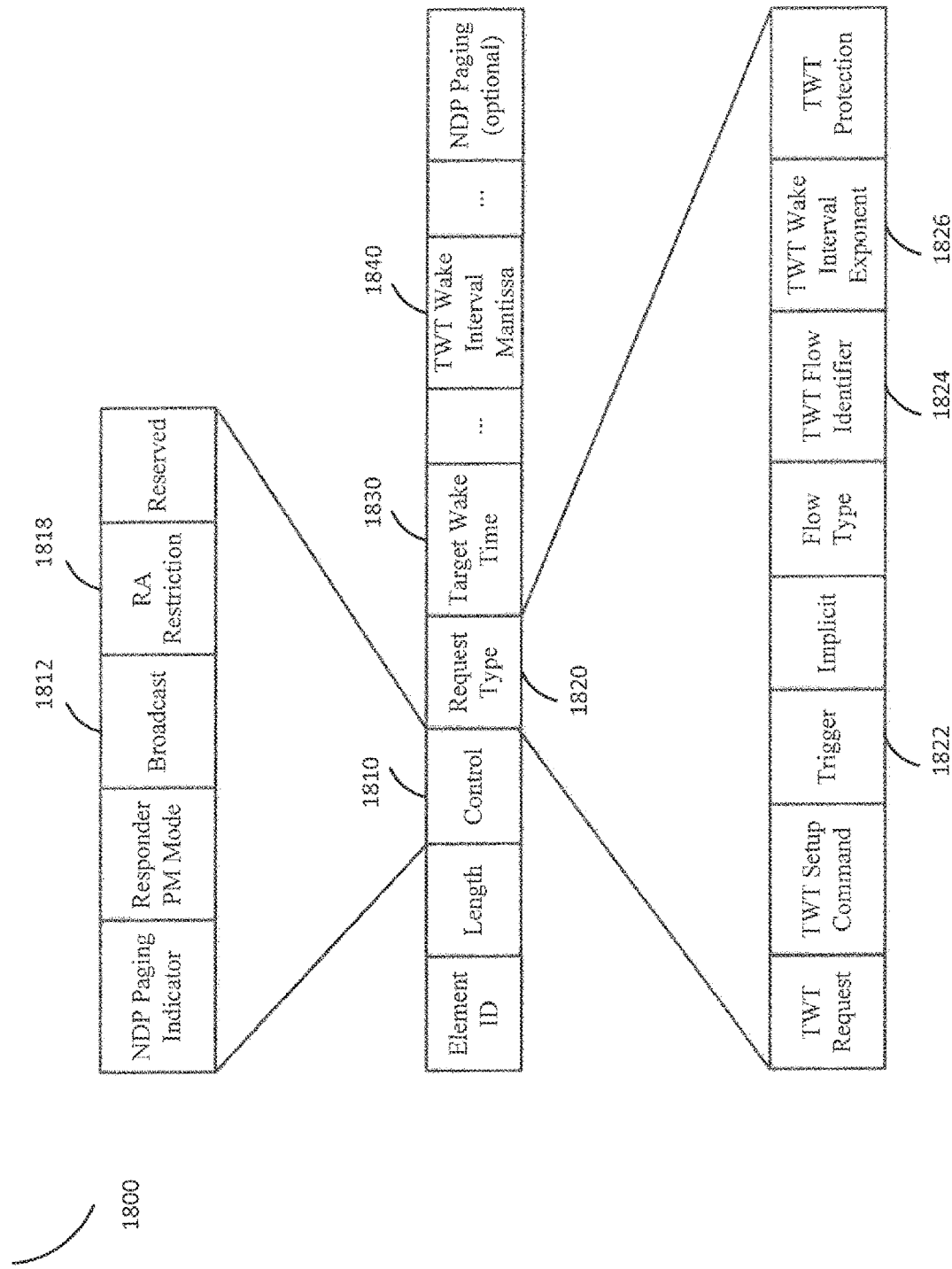
FIG. 18 is a diagram illustrating an example format of a TWT element according to a third embodiment of the present disclosure.

FIG. 18 illustrates an example format of an TWT element 1800 according to a third embodiment of the present disclosure. The TWT element 1800 comprises a Control field 1810, a Request Type field 1820, a Target Wake Time field 1830 and a TWT Wake Interval Mantissa field 1840. The Control field 1810 comprises a Broadcast subfield 1812. The Request Type field 1820 comprises a Trigger subfield 1822, a TWT Flow Identifier subfield 1824 and a TWT Wake Interval Exponent subfield 1826. The Request Type field 1820, the Target Wake Time field 1830 and the TWT Wake Interval Mantissa field 1840 are exactly the same as their counterparts 1720, 1730 and 1740. The Control field 1810 differs from its counterpart 1710 in that the former comprises an additional RA (Random Access) Restriction subfield 1818. The RA Restriction subfield 1818 indicates if at least one RU for random access in the Trigger frames transmitted within the broadcast TWT SP defined by the TWT element 1800 is available to 20 MHz operating STAs. The RA Restriction subfield 1818 is set to 0 to indicate that at least one RU for random access in the Trigger frames transmitted within the broadcast TWT SP is available to 20 MHz operating STAs. The RA Restriction subfield 1818 is set to 1 otherwise.

According to the third embodiment of the present disclosure, when a 20 MHz operating STA receives a Beacon frame or a management frame containing the TWT element 1800, it may enter the doze state until the start of the TWT SP defined by the TWT element 1800. This TWT element 1800 includes the Broadcast subfield 1812 set to 1, the Trigger subfield 1822 set to 1, the RA Restriction field 1818 set to 0 and the TWT Flow Identifier subfield 1824 set to either 0 or 2. And the trigger-based TWT SP defined by the TWT element 1800 contains one or more Trigger frames for random access in which at least one RU for random access is available to 20 MHz operating STAs. When a 20 MHz operating STA receives a Beacon frame or a management frame containing the TWT element 1800 with the Broadcast subfield 1812 set to 1, the Trigger subfield 1822 set to 1 and the RA Restriction subfield 1818 set to 1, namely, the trigger-based TWT SP defined by the TWT element 1800 contains one or more Trigger frames for random access in which no any RU for random access is available to 20 MHz operating STAs, it may enter the doze state at least until the end of the TWT SP defined by the TWT element 1800. As a result, according to the third embodiment of the present disclosure, using the RA Restriction subfield 1818 in the TWT element 1800, a 20 MHz operating STA may be able to save even more power, compared with the first example power save mechanism with UORA.

According to the third embodiment of the present disclosure, it is possible for a 20 MHz operating STA or a non-20 MHz operating STA to make use of values of signaling fields in the TWT element 1800 to save more power in various ways. For a first example, when a non-20 MHz operating STA receives a Beacon frame or a management frame containing the TWT element 1800 with the Broadcast subfield 1812 set to 1, the Trigger subfield 1822 set to 1 and the TWT Flow Identifier subfield 1824 set to either 0 or 2, namely the trigger-based TWT SP defined by the TWT element 1800 contains zero or more RUs for random access, it may enter the doze state until the start of the TWT SP defined by the TWT element 1800. For a second example, when a non-20 MHz operating STA or a 20 MHz operating STA receives a Beacon frame or a management frame containing the TWT element 1800 with the Broadcast subfield 1812 set to 1, the Trigger subfield 1822 set to 1 and the TWT Flow Identifier subfield 1824 set to 1, namely, the trigger-based TWT SP defined by the TWT element 1800 contains no RUs for random access, it may enter the doze state at least until the end of the TWT SP defined by the TWT element 1800. For a third example, when a non-20 MHz operating STA or a 20 MHz operating STA receives a Beacon frame or a management frame containing the TWT element 1800 with the Broadcast subfield 1812 set to 1 and the Trigger subfield 1822 set to 0, namely, the TWT SP defined by the TWT element 1800 contains no any Trigger frame, it may enter the doze state at least until the end of the TWT SP defined by the TWT element 1800.

Fourth Embodiment

According to a fourth embodiment of the present disclosure, the Common Info field 1010 of the Trigger frame 1000 as illustrated in FIG. 10 may include a Subsequent TF-R Indication subfield 1018. This Subsequent TF-R Indication subfield 1018 contains information to indicate if any subsequent Trigger frame includes at least one RU for random access which is available to 20 MHz operating STAs. The Subsequent TF-R Indication subfield 1018 is set to 1 to indicate that subsequent Trigger frames include at least one RU for random access which is available to 20 MHz operating STAs. The Subsequent TF-R Indication subfield 1018 is set to 0 otherwise.

According to the fourth embodiment of the present disclosure, if random access allocations are made in a sequence of Trigger frames within a Trigger enabled TWT SP, then all the Trigger frames in the sequence shall have the Cascade Indication field set to 1, except for the last Trigger frame in the sequence, which shall have the Cascade Indication field set to 0.

According to the fourth embodiment of the present disclosure, if random access allocations are made in a sequence of Trigger frames within a Trigger enabled TWT SP, a Trigger frame in the sequence shall have the Subsequent TF-R Indication subfield set to 0 if the following Trigger frames in the sequence do not contain any RU for random access which is available to 20 MHz operating STAs.

According to the fourth embodiment of the present disclosure, it is possible for a 20 MHz operating STA or a non-20 MHz operating STA to make use of the value indicated in the Cascade Indication field in a Trigger frame for power saving purpose in various ways. For a first example, if the OBO counter decrements to a non-zero value with a UORA method (e.g., the UORA method 500, the UORA method 800, the UORA method 600, the UORA method 1200 or the UORA method 1400) in a Trigger frame with Cascade Indication field set to 0 or if the OBO counter decrements to zero and but each of one or more 20 MHz channels including the selected RU is considered busy with a UORA method (e.g., the UORA method 500, the UORA method 800, the UORA method 600, the UORA method 1200 or the UORA method 1400) in a Trigger frame with Cascade Indication field set to 0, namely, there is no more cascaded Trigger frame, a 20 MHz operating STA or a non-20 MHz operating STA may enter the doze state immediately. If the OBO counter decrements to a non-zero value with a UORA method (e.g., the UORA method 600, the UORA method 1200 or the UORA method 1400) in a Trigger frame with Cascade Indication field set to 1 or if the OBO counter decrements to zero and but each of one or more 20 MHz channels including the selected RU is considered busy with a UORA method (e.g., the UORA method 600, the UORA method 1200 or the UORA method 1400) in a Trigger frame with Cascade Indication field set to 1, namely, there is at least one more cascaded Trigger frame, a non-20 MHz operating STA may remain awake for random access in the cascaded Trigger frame.

According to the fourth embodiment of the present disclosure, a 20 MHz operating STA may use the value indicated in the Cascade Indication field and the value indicated in the Subsequent TF-R Indication subfield in a Trigger frame to enter the doze state. For example, if the OBO counter decrements to a non-zero value with a UORA method (e.g., the UORA method 500 or the UORA method 800) in a Trigger frame with Cascade Indication field set to 1 and the Subsequent TF-R Indication field set to 0, no any RU for random access in the cascaded Trigger frame is available to 20 MHz operating STAs. And the 20 MHz operating STA may enter the doze state immediately. For another example, if the OBO counter decrements to zero but each of one or more 20 MHz channels including the selected RU is considered busy with a UORA method (e.g., the UORA method 500 or the UORA method 800) in a Trigger frame with Cascade Indication field set to 1 and the Subsequent TF-R Indication field set to 0, namely, no any RU for random access in the cascaded Trigger frame is available to 20 MHz operating STAs. And the 20 MHz operating STA may enter the doze state immediately.

As a result, according to the fourth embodiment of the present disclosure, using the Subsequent TF-R Indication subfield in the Trigger frame, a 20 MHz operating STA may be able to save even more power, compared with the second example power save mechanism with UORA. If the OBO counter decrements to a non-zero value with a UORA method (e.g., the UORA method 500 or the UORA method 800) in a Trigger frame with Cascade Indication field set to 1 and the Subsequent TF-R Indication field set to 1, at least one RU for random access in the cascaded Trigger frame is available to 20 MHz operating STAs. And the 20 MHz operating STA may remain awake for random access in the cascaded Trigger frame. Or if the OBO counter decrements to zero but each of one or more 20 MHz channels including the selected RU is considered busy with a UORA method (e.g., the UORA method 500 or the UORA method 800) in a Trigger frame with Cascade Indication field set to 1 and the Subsequent TF-R Indication field set to 1, namely, at least one RU for random access in the cascaded Trigger frame is available to 20 MHz operating STAs. And the 20 MHz operating STA may remain awake for random access in the cascaded Trigger frame.

<Configuration of a STA>

Figure 19A:
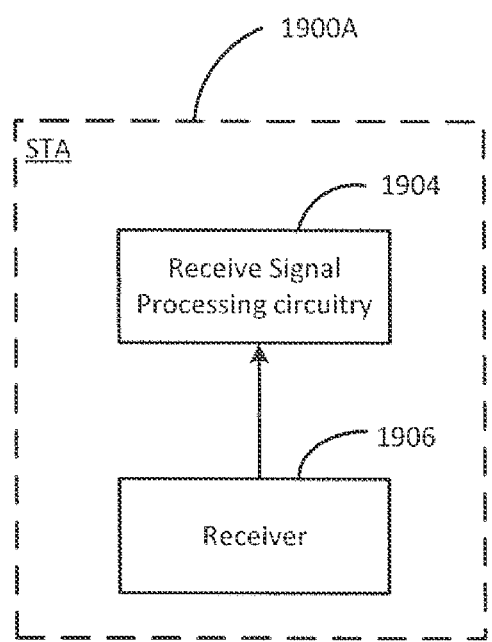
FIG. 19A is a simple block diagram of an example STA according to the present disclosure.

FIG. 19A is a simple block diagram of an example STA 1900A, which may be any one of the STAs in FIG. 1. The STA 1900A comprises a receive signal processing circuitry 1904 and a receiver 1906. The receiver 1906 receives a plurality of signals transmitted by an AP. Each of the received signals may carry a Trigger frame for random access, a Beacon frame including the TWT element, or a management frame including the TWT element. The trigger frame is configured according to the first embodiment, the second embodiment and/or the fourth embodiment of the present disclosure. The TWT element is configured according to the third embodiment of the present disclosure. The receive signal processing circuitry 1904 processes the received signals.

Figure 19B:
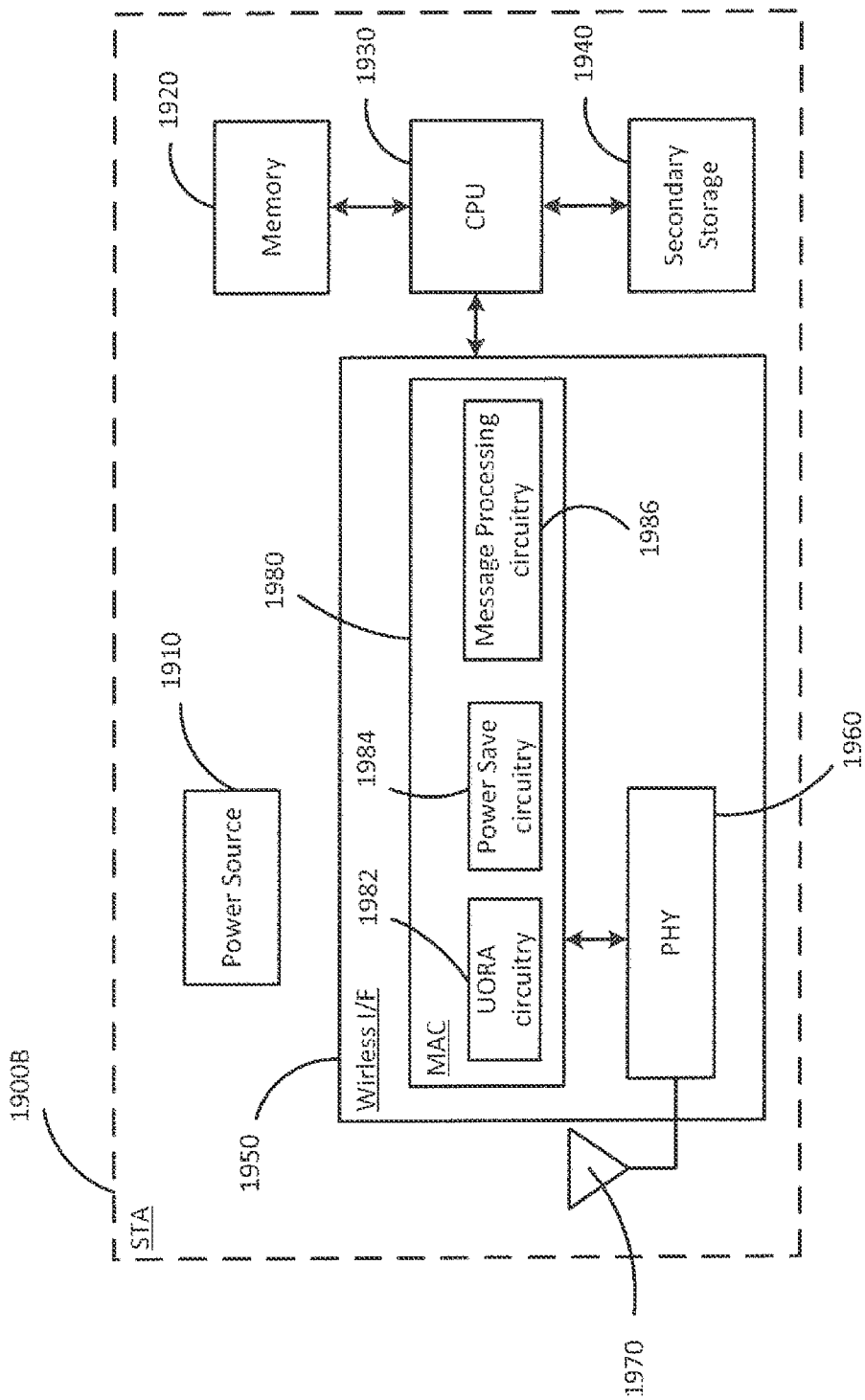
FIG. 19B is a detailed block diagram of an example STA according to the present disclosure.

FIG. 19B is a detailed block diagram of an example STA 1900B, which may be any one of the STAs in FIG. 1. The STA 1900B comprises a CPU (Central Processing Unit) 1930 coupled to a memory 1920, a secondary storage 1940 and to one or more wireless communication interfaces 1950. The secondary storage 1940 may be a non-volatile computer readable storage medium that is used to permanently store pertinent instruction codes and data, etc. At the time of start up, the CPU 1930 may copy the instruction codes as well as related data to the volatile memory 1920 for execution. The instruction code may be an operating system, user applications, device drivers and execution codes, etc, which are required for the operation of the STA 1900B. The STA 1900B may also comprise a power source 1910, for example, a lithium ion battery or a coin cell battery, etc. The wireless communication interface 1950 may comprise an interface for cellular communication or an interface for short range communication protocols such as Zigbee or it may be a WLAN interface. The wireless communication interface 1950 may further comprise a MAC (Medium Access Control Layer) module 1980 and a PHY (Physical Layer) module 1960. The MAC module 1980 may comprise a UORA circuitry 1982 which is responsible for operating UORA method according to the first or second embodiments of the present disclosure. The MAC module 1980 may also comprise a power save circuitry 1984 which is responsible for configuring the STA 1900B to enter the doze state according to the third and fourth embodiments of the present disclosure. The MAC module 1980 may also comprise a message processing circuitry 1986 which is responsible for generating MAC frames to be transmitted and processing received MAC frames (e.g., Trigger frame, Beacon frame, etc.). The PHY module 1960 is responsible for converting data of the MAC module 1980 to/from the transmission/reception signals. The wireless communication interface 1950 may also be coupled, via the PHY module 1960, to one or more antennas 1970 that are responsible for the actual transmission/reception of the wireless communication signals on/from the wireless medium.

STA 1900B may comprise many other components that are not illustrated, for sake of clarity, in FIG. 19B. Only those components that are most pertinent to the present disclosure are illustrated.

<Configuration of an Access Point>

Figure 20A:
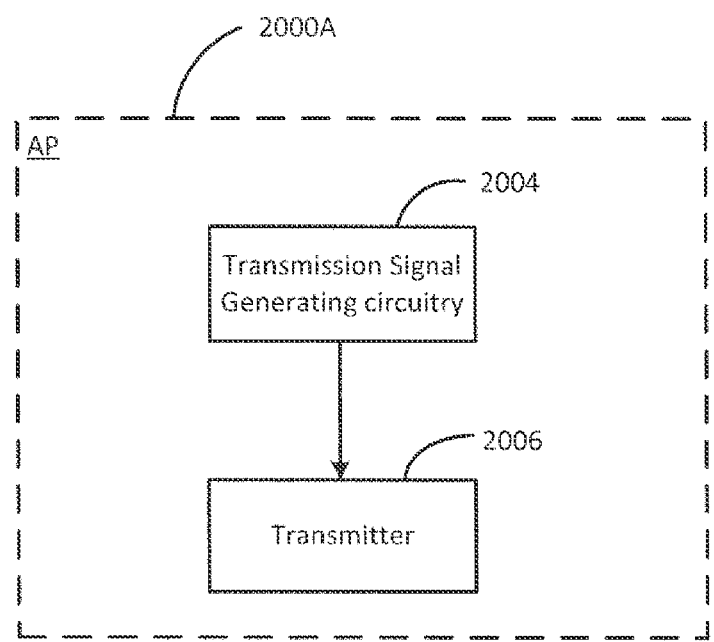
FIG. 20A is a simple block diagram of an example AP according to the present disclosure.

FIG. 20A is a simple block diagram of an example AP 2000A, which may be the AP 110 in FIG. 1. The AP 2000A comprises a transmission signal generating circuitry 2004 and a transmitter 2006. The transmission signal generating circuitry 2004 generates a plurality of transmission signals. Each of the transmission signals may carry a Trigger frame for random access, a Beacon frame including the TWT element, or a management frame including the TWT element. The trigger frame is configured according to the first embodiment, the second embodiment and/or the fourth embodiment of the present disclosure. The TWT element is configured according to the third embodiment of the present disclosure. The transmitter 2006 transmits the generated transmission signals.

Figure 20B:
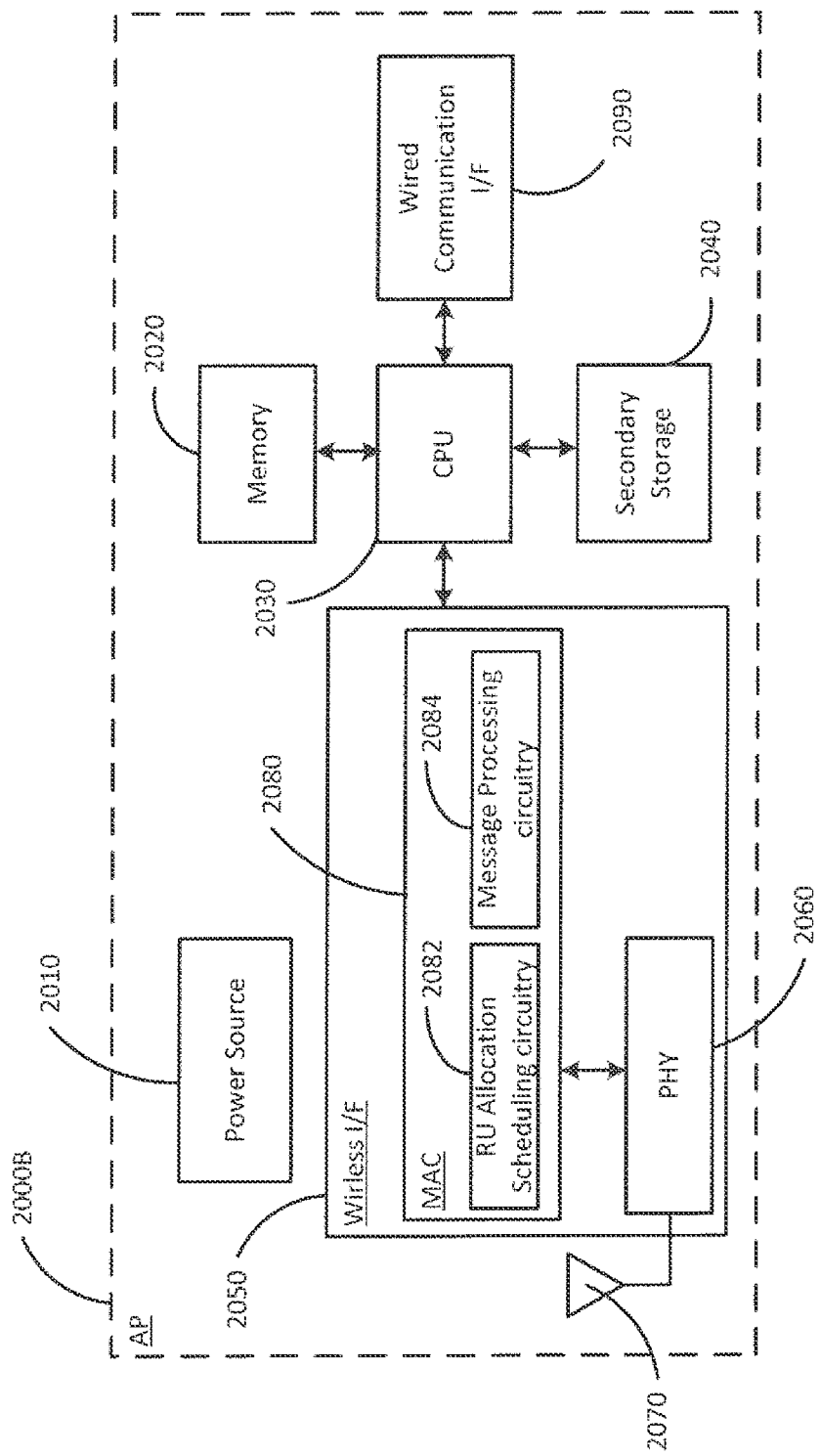
FIG. 20B is a detailed block diagram of an example AP according to the present disclosure.

FIG. 20B is a detailed block diagram of an example AP 2000B, which may be the AP 110 in FIG. 1. The AP 2000B comprises a CPU 2030 coupled to a memory 2020, a secondary storage 2040, to one or more wireless communication interfaces 2050, as well as to other wired communication interfaces 2080. The secondary storage 2040 may be a non-volatile computer readable storage medium that is used to permanently store pertinent instruction codes and data, etc. At the time of start up, the CPU 2030 may copy the instruction codes as well as related data to the volatile memory 2020 for execution. The instruction code may be an operating system, user applications, device drivers and execution codes, etc, which are required for the operation of the AP 2000B. The size of the instruction code and hence the storage capacity of both the secondary storage 2040 as well as the memory 2020 may be substantially bigger than that of the STA 1900B.

The AP 2000B may also comprise a power source 2010 which in most cases may be a power mains but in some cases may also be some kind of high capacity battery, for example, a car battery. The wired communication interface 2090 may be an ethernet interface, or a powerline interface, or a telephone line interface, etc. The wireless communication interface 2050 may comprise an interface for cellular communication, or an interface for short range communication protocols such as Zigbee, or it may be a WLAN interface.

The wireless communication interface 2050 may further comprise a MAC module 2080 and a PHY module 2060. The MAC module 2080 may comprise an RU allocation scheduling circuitry 2082 which is responsible for allocate RUs for DL or UL OFDMA transmission. In particular, the RU allocation scheduling circuitry 2082 allocates RUs for random access in Trigger frames according to the first or second embodiments of the present disclosure. The MAC module 2080 may also comprise a message processing circuitry 2084 which is responsible for generating MAC messages to be transmitted and processing received MAC messages. In particular, the message processing circuitry 2084 generates a Trigger frame, a TWT element included in a Beacon frame or a management frame, or a UORA parameter element included in a Beacon frame or a Probe Response frame according to the first, second, third or fourth embodiment of the present disclosure.

The PHY module 2060 is responsible for converting data of the MAC module 2080 to/from the transmission/reception signals. The wireless communication interface 2050 may also be coupled, via the PHY module 2060, to one or more antennas 2070 that are responsible for the actual transmission/reception of the wireless communication signals on/from the wireless medium.

AP 2000B may comprise many other components that are not illustrated, for sake of clarity, in FIG. 20B. Only those components that are most pertinent to the present disclosure are illustrated.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing, as a result of the advancement of semiconductor technology or other derivative technology.

Should a circuit integration technology replacing LSI appear as a result of advancements in semiconductor technology or other technologies derived from the technology, the functional blocks could be integrated using the future integrated circuit technology. Another possibility is the application of biotechnology and/or the like.

INDUSTRIAL APPLICABILITY

This disclosure can be applied to a method for random access in a multiuser wireless communication system.

REFERENCE SIGNS LIST

| 1900A, 1900B | STA |
| --- | --- |
| 1904 | Receive Signal Processing circuitry |
| 1906 | Receiver |
| 1910, 2010 | Power Source |
| 1920, 2020 | Memory |
| 1930, 2030 | CPU |
| 1940, 2040 | Secondary Storage |

-continued

| 1950, 2050 | Wireless Interface |
| --- | --- |
| 1960, 2060 | PHY module |
| 1970, 2070 | Antenna(s) |
| 1980, 2080 | MAC module |
| 1982 | UORA circuitry |
| 1984 | Power Save circuitry |
| 1986, 2084 | Message Processing circuitry |
| 2000A, 2000B | AP |
| 2004 | Transmission Signal Generating circuitry |
| 2006 | Transmitter |
| 2082 | RU Allocation Scheduling circuitry |
| 2090 | Wired Communication Interface |

The invention claimed is:

1. A communication apparatus that is a 20 MHz operating station, comprising:
    at least one antenna which, in operation, receives a Trigger frame for allocating resource units (RUs) for random access and another frame including a Random Access parameter element that comprises a first field indicating an OFDMA contention window (OCW) minimum value (OCWmin), wherein the RU(s) include at least one RU that is restricted from being used for the 20 MHz operating station; and
    control circuitry which, in operation, controls an Uplink OFDMA-based Random Access (UORA) procedure using the OCWmin,
    wherein the control circuitry, in operation:
        decrements an OFDMA Back-Off (OBO) counter to zero when the OBO counter is not greater than a number of available RU(s) for random access in the Trigger frame, the available RU(s) being RU(s) unrestricted from being used for the 20 MHz operating station; or
        decrements the OBO counter by the number of the available RU(s) for random access otherwise.

2. The communication apparatus according to claim 1, wherein the another frame is one of a Beacon frame and a Probe response frame.

3. The communication apparatus according to claim 1, wherein the communication apparatus is able to operate with 20 MHz channel width only.

4. The communication apparatus according to claim 1, wherein the Random Access parameter element comprises a second field indicating an OCW maximum value (OCWmax) and the control circuitry, in operation:
    sets an OCW value within a range of the OCWmin and the OCWmax; and
    initializes the OBO counter to an integer value in a range of 0 and the OCW value.

5. The communication apparatus according to claim 1, wherein
    the communication apparatus is a station apparatus operating on a primary 20 MHz channel bandwidth; and
    the available RU(s) for random access is RU(s) unrestricted from being used for the station apparatus within the primary 20 MHz channel bandwidth.

6. The communication apparatus according to claim 1, wherein the communication apparatus is a 20 MHz only non-Access Point station apparatus operating on a 20 MHz channel bandwidth.

7. The communication apparatus according to claim 1, wherein the Trigger frame comprises a common information field and a plurality of user information fields, each of the plurality of user information fields including an identifier subfield and an RU allocation subfield that indicates an RU used for uplink data transmission by a station apparatus identified by the identifier subfield.

8. An access point comprising:
a transmitter, which, in operation, transmits a Trigger frame for allocating resource units (RUs) for random access and another frame including a Random Access parameter element that comprises a first field indicating an OFDMA contention window (OCW) minimum value (OCWmin), wherein the RU(s) include at least one RU that is restricted from being used for a 20 MHz operating station; and
a receiver, which, in operation, receive an Uplink OFDMA-based Random Access (UORA) signal,
wherein the UORA signal is transmitted by the 20 MHz operating station using UORA procedure, the UORA procedure comprising,
decrementing an OFDMA Back-Off (OBO) counter to zero when the OBO counter is not greater than a number of available RU(s) for random access in the Trigger frame, the available RU(s) being RU(s) unrestricted from being used for the 20 MHz operating station, or
decrementing the OBO counter by the number of the available RU(s) for random access otherwise.

9. The access point according to claim 8, wherein the another frame is one of a Beacon frame and a Probe response frame.

10. The access point according to claim 8, wherein the 20 MHz operating station is able to operate with 20 MHz channel width only.

11. The access point according to claim 8, wherein the Random Access parameter element comprises a second field indicating an OCW maximum value (OCWmax), and
an OCW value is set within a range of the OCWmin and the OCWmax, and
the OBO counter is initialized to an integer value in a range of 0 and the OCW value.

12. The access point according to claim 8, wherein
the 20 MHz operating station is a station apparatus operating on a primary 20 MHz channel bandwidth; and
the available RU(s) for random access is RU(s) unrestricted from being used for the station apparatus within the primary 20 MHz channel bandwidth.

13. The access point according to claim 8, wherein the 20 MHz operating station is a 20 MHz only non-Access Point station apparatus operating on a 20 MHz channel bandwidth.

14. The access point according to claim 8, wherein the Trigger frame comprises a common information field and a plurality of user information fields, each of the plurality of user information fields including an identifier subfield and an RU allocation subfield that indicates an RU used for uplink data transmission by a station apparatus identified by the identifier subfield.

* * * * *